(12) United States Patent
Chen et al.

(10) Patent No.: US 10,261,837 B2
(45) Date of Patent: Apr. 16, 2019

(54) TWO-PART JOB SCHEDULING WITH CAPACITY CONSTRAINTS AND PREFERENCES

(71) Applicant: SAS Institute Inc., Cary, NC (US)

(72) Inventors: Feng (Jason) Chen, Apex, NC (US); Matthew Scott Maxwell, Cary, NC (US); Tugrul Sanli, Cary, NC (US); Xiaodong Yao, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/023,949

(22) Filed: Jun. 29, 2018

(65) Prior Publication Data

US 2019/0012210 A1    Jan. 10, 2019

Related U.S. Application Data

(60) Provisional application No. 62/527,992, filed on Jun. 30, 2017.

(51) Int. Cl.
*G06F 9/46* (2006.01)
*G06F 9/50* (2006.01)
*G06F 9/48* (2006.01)
*H04L 12/911* (2013.01)
(Continued)

(52) U.S. Cl.
CPC .......... *G06F 9/5055* (2013.01); *G06F 9/4881* (2013.01); *G06F 9/5011* (2013.01); *G06N 7/005* (2013.01); *H04L 47/781* (2013.01); *H04L 47/823* (2013.01); *H04L 67/10* (2013.01)

(58) Field of Classification Search
None
See application file for complete search history.

(56) References Cited

U.S. PATENT DOCUMENTS

| 4,852,001 A | 7/1989 | Tsushima et al. |
| 4,896,269 A | 1/1990 | Tong |
| 4,947,397 A | 8/1990 | Sobel et al. |

(Continued)

FOREIGN PATENT DOCUMENTS

JP    2004126968 A    4/2004

OTHER PUBLICATIONS

Rothstein, Marvin, "Airline Overbooking: The State of the Art". Journal of Transport Economics and Policy, Jan. 1971, 4 pages.

(Continued)

*Primary Examiner* — Wissam Rashid

(57) ABSTRACT

Exemplary embodiments relate to the problem of allocating a finite number of units of a resource among requestors willing to offer different amounts of value for the resource. When different classes of requestors are permitted to cancel the request or fail to show up to collect the unit of the resource with different probabilities (collectively referred to as "wash"), the problem becomes difficult to solve efficiently. According to the procedures described herein, the capacity is artificially inflated to offset the impact of wash, and then protection levels are computed using the inflated capacity as if there was no wash. The capacity is then artificially inflated again based on the new protection levels, and the process is repeated until, e.g., the results converge. Using this procedure, overallocation limits and protection levels can be computed in real-time, and accordingly the resource can be allocated efficiently as new requests are received.

30 Claims, 17 Drawing Sheets

(51) Int. Cl.
*G06N 7/00* (2006.01)
*H04L 29/08* (2006.01)

(56) References Cited

U.S. PATENT DOCUMENTS

| | | | |
|---|---|---|---|
| 5,093,794 | A | 3/1992 | Howie et al. |
| 5,319,464 | A | 6/1994 | Douglas et al. |
| 5,361,362 | A | 11/1994 | Benkeser et al. |
| 5,363,175 | A | 11/1994 | Matysek |
| 5,442,730 | A | 8/1995 | Bigus |
| 5,709,410 | A | 1/1998 | Reeves, Jr. |
| 5,881,283 | A | 3/1999 | Hondou et al. |
| 5,978,830 | A | 11/1999 | Nakaya et al. |
| 6,038,539 | A | 3/2000 | Maruyama et al. |
| 6,070,144 | A | 5/2000 | Ginsberg et al. |
| 6,213,652 | B1 | 4/2001 | Suzuki et al. |
| 6,272,606 | B1 | 8/2001 | Dorricott et al. |
| 6,353,844 | B1 | 3/2002 | Bitar et al. |
| 6,665,740 | B1 | 12/2003 | Mason, Jr. et al. |
| 6,694,345 | B1 | 2/2004 | Brelsford et al. |
| 6,889,243 | B1 | 5/2005 | Hondou et al. |
| 7,024,671 | B2 | 4/2006 | Yamashita |
| 7,076,781 | B2 | 7/2006 | Skovira |
| 7,100,074 | B2 | 8/2006 | Watanabe et al. |
| 7,233,792 | B2 | 6/2007 | Chang |
| 7,502,747 | B1 | 3/2009 | Pardo et al. |
| 7,596,788 | B1 | 9/2009 | Shpigelman |
| 7,721,290 | B2 | 5/2010 | Horikawa |
| 7,861,246 | B2 | 12/2010 | Lu et al. |
| 8,600,787 | B2 | 12/2013 | Fox et al. |
| 8,645,173 | B2 | 2/2014 | Fox et al. |
| 2002/0016809 | A1 | 2/2002 | Foulger et al. |
| 2004/0237087 | A1 | 11/2004 | Ye et al. |
| 2005/0065826 | A1 | 3/2005 | Baker et al. |
| 2005/0131865 | A1 | 6/2005 | Jones et al. |
| 2005/0235286 | A1 | 10/2005 | Ballew et al. |
| 2005/0262506 | A1 | 11/2005 | Dawson et al. |
| 2006/0149755 | A1 | 7/2006 | Marshall et al. |
| 2006/0288346 | A1 | 12/2006 | Santos et al. |
| 2007/0061180 | A1 | 3/2007 | Offenberg |
| 2007/0143499 | A1 | 6/2007 | Chang |
| 2008/0120620 | A1 | 5/2008 | Lett et al. |
| 2008/0184248 | A1 | 7/2008 | Barua et al. |
| 2011/0271283 | A1 | 11/2011 | Bell, Jr. et al. |
| 2012/0226788 | A1 | 9/2012 | Jackson |
| 2013/0132128 | A1 | 5/2013 | Fox et al. |
| 2013/0132131 | A1 | 5/2013 | Fox et al. |
| 2013/0179894 | A1 | 7/2013 | Calder et al. |
| 2013/0191843 | A1 | 7/2013 | Sarkar et al. |
| 2015/0312335 | A1 | 10/2015 | Ying et al. |

OTHER PUBLICATIONS

Kumar et al., "An efficient Genetic Algorithm Approach for Minimising the makespan of Job Shop Scheduling Problems", International Journal of Science, Engineering and Technology Research (IJSETR) vol. 5, Issue 5, May 2016. 9 pages.

Author Unknown, "Azkaban 3.0 Documentation", GitHub, Dec. 19, 2017, http://azkaban.github.io/azkaban/docs/latest/ 106 Pages.

E. Frachtenberg, G. Feitelson, F. Petrini and J. Fernandez, "Adaptive parallel job scheduling with flexible coscheduling," in IEEE Transactions on Parallel and Distributed Systems, vol. 16, No. 11, pp. 1066-1077, Nov. 2005.

Mohr, James, "Job Scheduling a la Carte", Linux Magazine, Issue 97, Dec. 2008, http://www.linux-magazine.com/Issues/2008/97/Open-Source-Job-Scheduler 10 pages.

Author Unknown, "Job scheduler", Wikipedia, Dec. 19, 2017, https://en.wikipedia.org/wiki/Job_scheduler 4 pages.

Author Unknown, "Johnson's rule", Wikipedia, 2018 Mar. 2018, https://en.wikipedia.org/wiki/Johnson%27s_rule 3 pages.

Author Unknown, MapReduce Tutorial, Hadoop, Aug. 4, 2014, https://hadoop.apache.org/docs/r1.2.1/mapred_tutorial.html 34 pages.

Brinkmann, Martin, "Z-Cron: task scheduling for Windows", Ghacks.net, May 31, 2017, <https://www.ghacks.net/2017/05/31/z-cron/task-scheduling-for-windows/ 11 pages.

Rothstein, Marvin, "OR and Airline Overbooking Problem", Institute for Operations Research and the Management Sciences (INFORMS), Operations Research, vol. 33, No. 2 Mar.-Apr. 1985) pp. 237-248. <http://www.jstor.org/stable/170741, accessed Jul. 31, 2017.

Feitelson et al., "Theory and Practice in Parallel Job Scheduling", IPPS '97 Processing Workshop, Geneva, Switzerland, Apr. 5, 1997, Proceedings.

Vegda et al., "Scheduling of Dependent Tasks Application using Random Search Technique", 2014 IEEE International Advanced Computing Conference (IACC), Mar. 27, 2014.

Marchal et al., "Scheduling tree-shaped task graphs to minimize memory and makespan", Inria-Informatics Mathematics, Research Report N° 8082, Oct. 2012, Project-Team ROMA.

Nieberg, Tim, "Scheduling Parallel Machine Scheduling", http://www.or.uni-bonn.de/lectures/ss10/scheduling_data/sched10_4.pdf.

TWO-PART JOB SCHEDULING WITH CAPACITY CONSTRAINTS AND PREFERENCES

RELATED APPLICATIONS

This application claims the benefit of priority to U.S. Provisional Patent Application Ser. No. 62/527,992, filed on Jun. 30, 2017. The contents of the aforementioned application are incorporated herein by reference.

SUMMARY

This summary is not intended to identify only key or essential features of the described subject matter, nor is it intended to be used in isolation to determine the scope of the described subject matter. The subject matter should be understood by reference to appropriate portions of the entire specification of this patent application, any or all drawings, and each claim.

According to exemplary embodiments, methods, mediums, and systems are described for providing a job scheduler. The job scheduler may be configured to allocate units of a resource having a limited capacity to different classes of requestors, each class having a distinct probability of failing to use an allocated unit of the resource and being associated with a value. For example, the job scheduler may allocate computer processing resources, storage capacity, cache space, network bandwidth, tangible items, units of services, etc.

To that end, the job scheduler may determine an overallocation limit representing an upper limit to which the resource may be overallocated. The overallocation limit is initially determined by: determining a probability among the requestors that the requestors fail to use the allocated unit of the resource, averaged over the requestors, based on historical probabilities for the resource among the classes of requestors, and determining an average value loss representing an amount of value lost in an event that a given requestor fails to use the allocated unit of the resource, averaged over the requestors, based on historical value loss percentages. The average probability may be used to determine an estimated net capacity utilization, and the average probability and the average value loss may be used to determine an estimated total value lost among requestors that are predicted to fail to use the allocated unit of the resource. Based at least in part on a value gained from requestors at the net capacity utilization and the estimated total value lost (and, optionally, a penalty for being unable to provide an allocated unit of the resource), the overallocation limit may be adjusted to maximize an expected value among the different classes of requestors. The value of the overallocation limit may be limited or restricted by a predetermined overallocation upper bound.

Using the overallocation limit determined above, the capacity for the resource may be (artificially) inflated by adding the overallocation limit to the capacity. Based on the inflated capacity, a protection level for each of the different classes may be determined. The protection level may define an amount of capacity to reserve for future demand. The protection level may be determined by maximizing an expected value for the different classes that arrive in the future given an amount of capacity allocated to a current class and a number of the different classes.

The values of the overallocation limit and the protection levels may be determined substantially in real-time as demands for units of the resource are received. In some cases, a penalty may be associated with allocating a unit of the resource but failing to provide the unit of the resource. The overallocation limit and/or the protection levels may be determined, at least in part, based on the penalty.

Based on the updated protection levels, the probability that the requestor fails to use the allocated unit of the resource and the average value loss in the event that the requestor fails to use the allocated unit of the resource may be updated.

The above-described procedure may be repeated until a stopping condition is reached. For example, the stopping condition may be a maximum number of iterations, a maximum amount of time allowed to elapse, or the convergence of the overallocation limit and/or protection levels between iterations.

Once the stopping condition is reached, the values of the overallocation limit and the protection levels set at the time the stopping condition is reached may be provided to a task management controller. The task management controller may determine whether to allocate a unit of the resource to a requestor from the current class based on whether the overallocation limit has not yet been reached and based on whether capacity remains under the protection level.

In some embodiments, demand for a unit of the resource may occur in two parts. A first part may not consume any of the resource, and may be associated with a first preference value. In some embodiments, the first part may be guaranteed to succeed or execute. A second part may be associated with a second preference value, and may succeed or fail with some known probability. If the second part succeeds, a unit of the resource may be consumed. If the second part fails, the unit of the resource is not consumed and a certain amount of value may be lost. The protection levels may be determined, at least in part, based on the first preference value and the second preference value. The scheduler may be configured to attempt to maximize a sum of the first preference value and the second preference value among the requestors.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive. [0001] Systems depicted in some of the figures may be provided in various configurations. In some embodiments, the systems may be configured as a distributed system where one or more components of the system are distributed across one or more networks in a cloud computing system.

Figure 1:
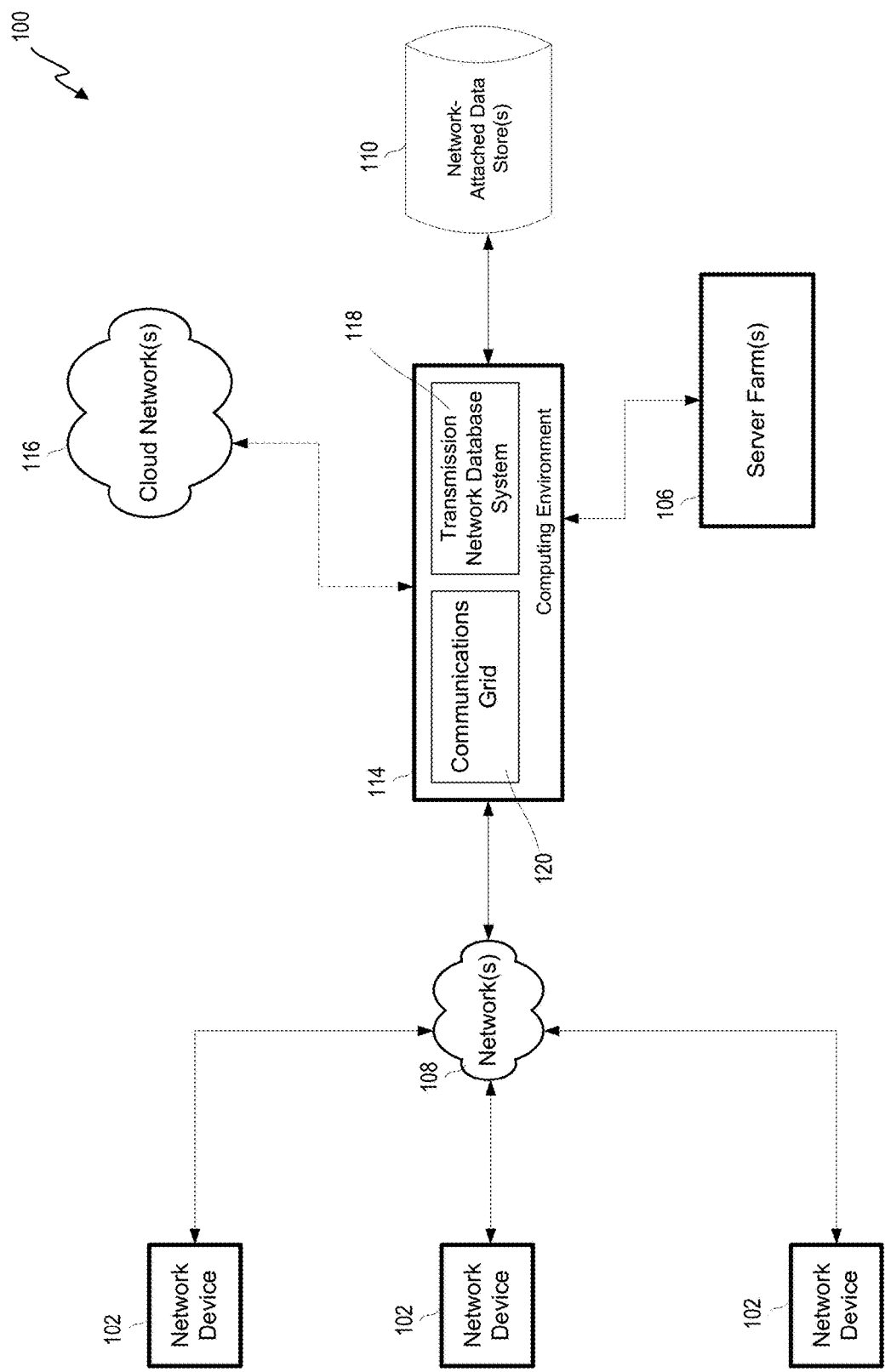
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
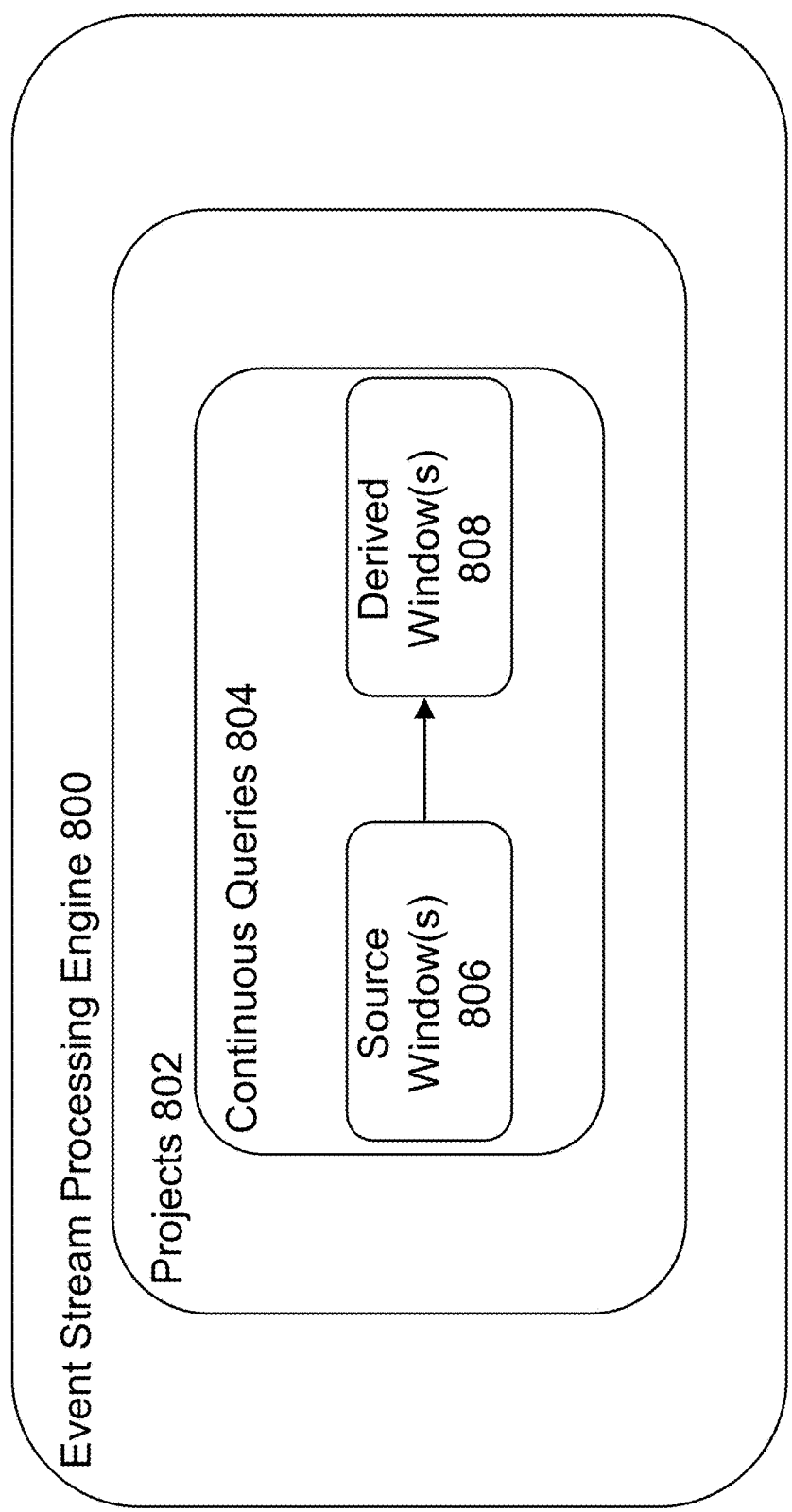
FIG. 8 illustrates a block diagram including components of an Event Stream Processing Engine (ESPE), according to embodiments of the present technology.
Figure 9:
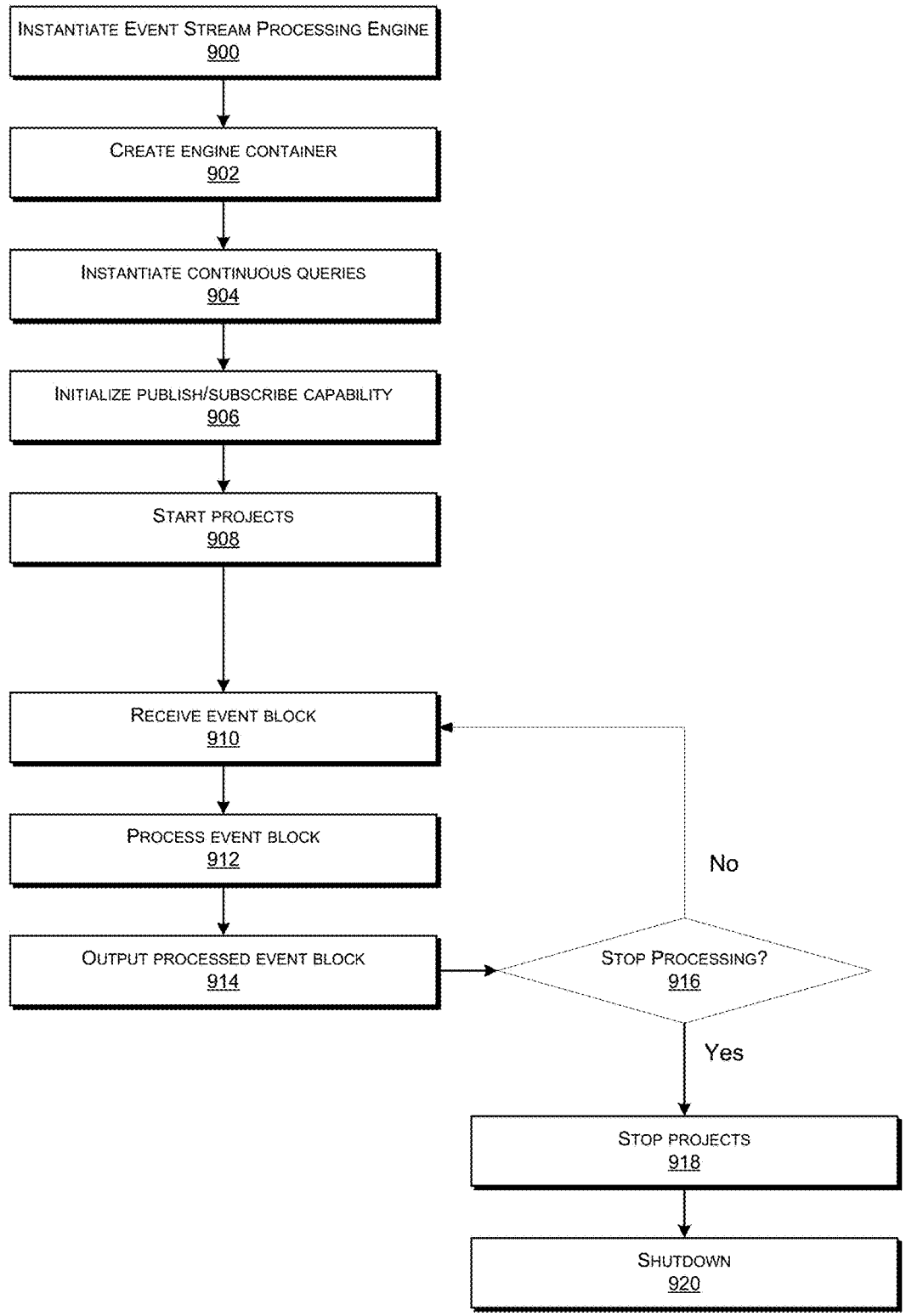
FIG. 9 illustrates a flow chart showing an example process including operations performed by an event stream processing engine, according to some embodiments of the present technology.
Figure 10:
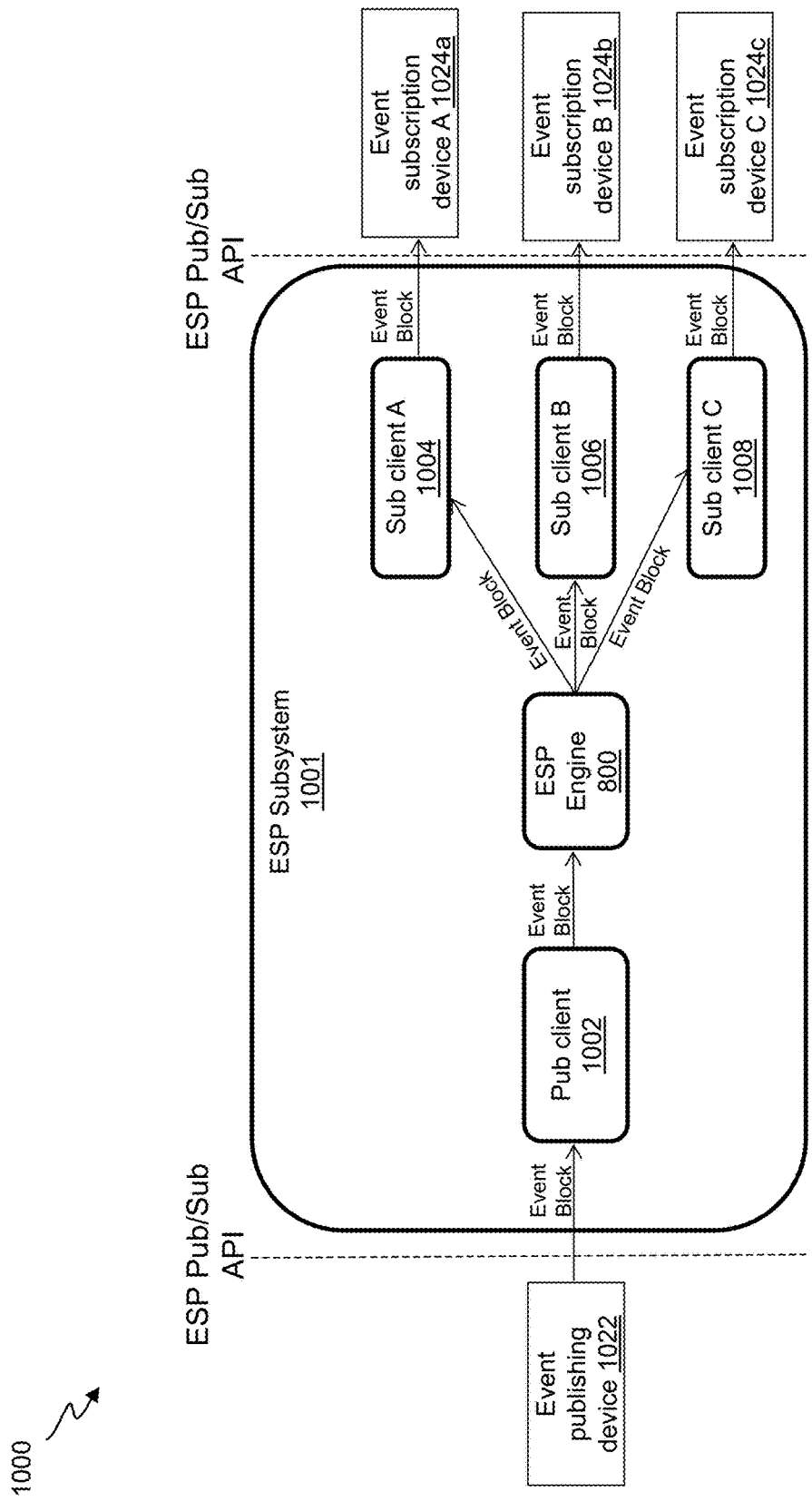
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
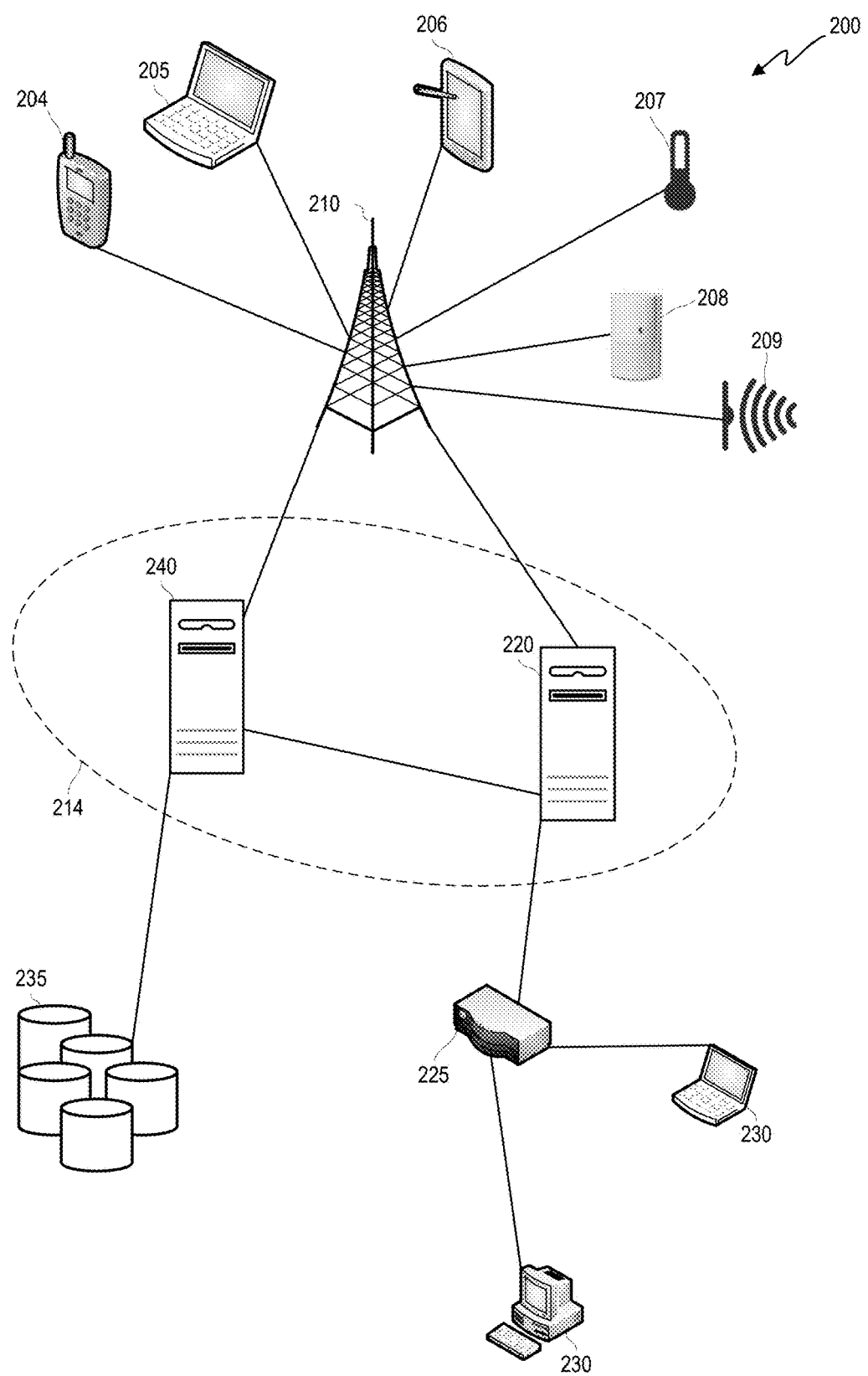
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values computed from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
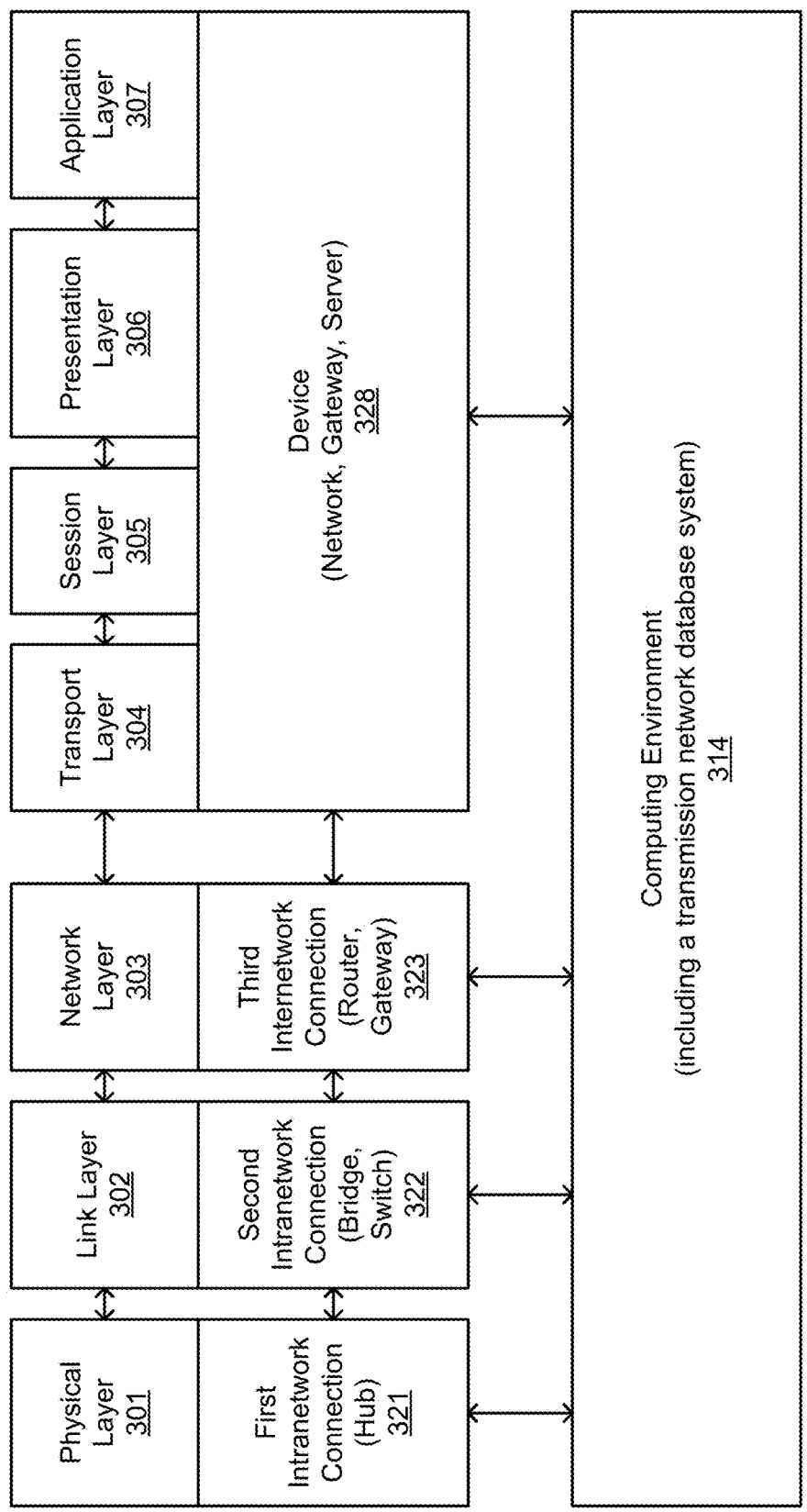
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
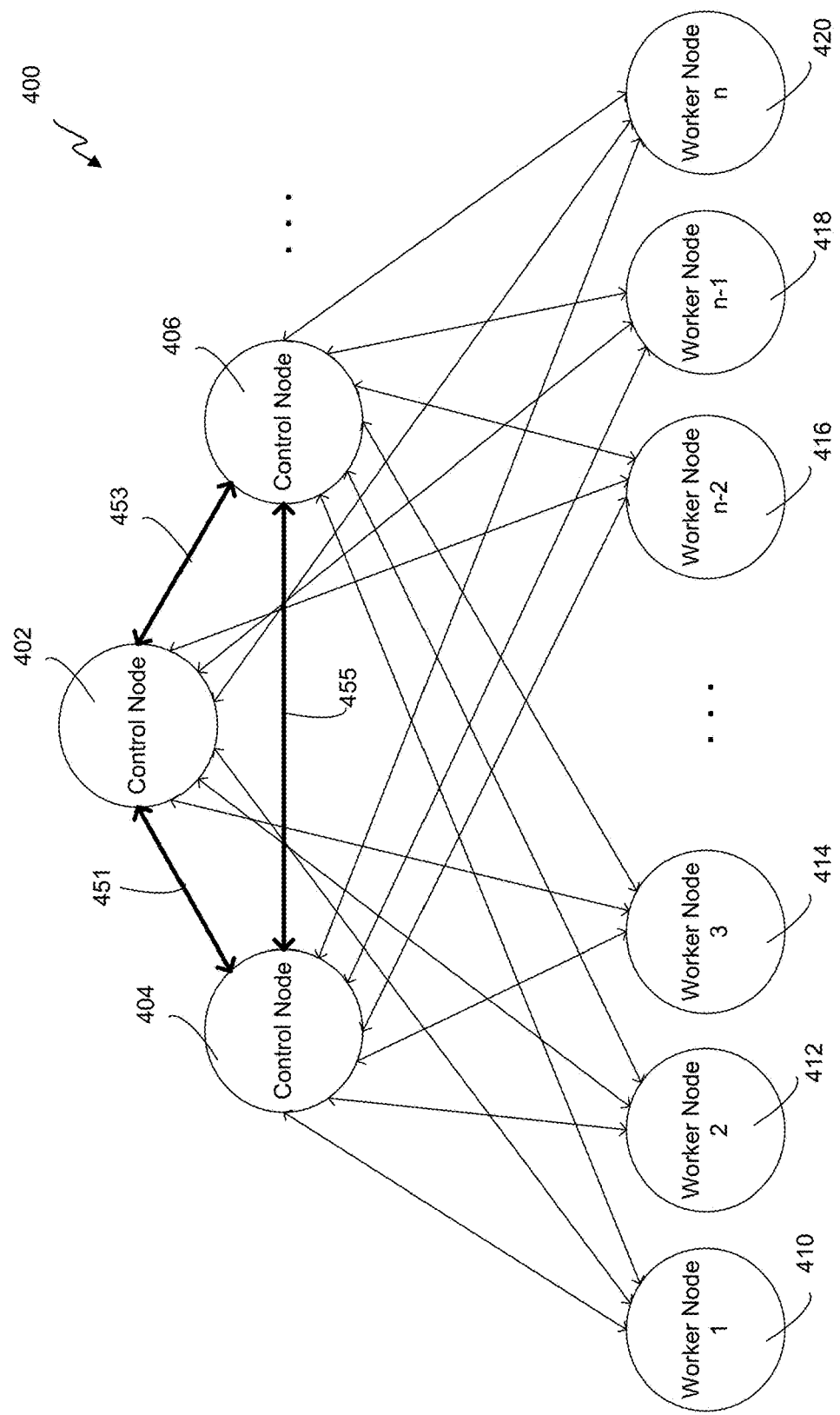
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
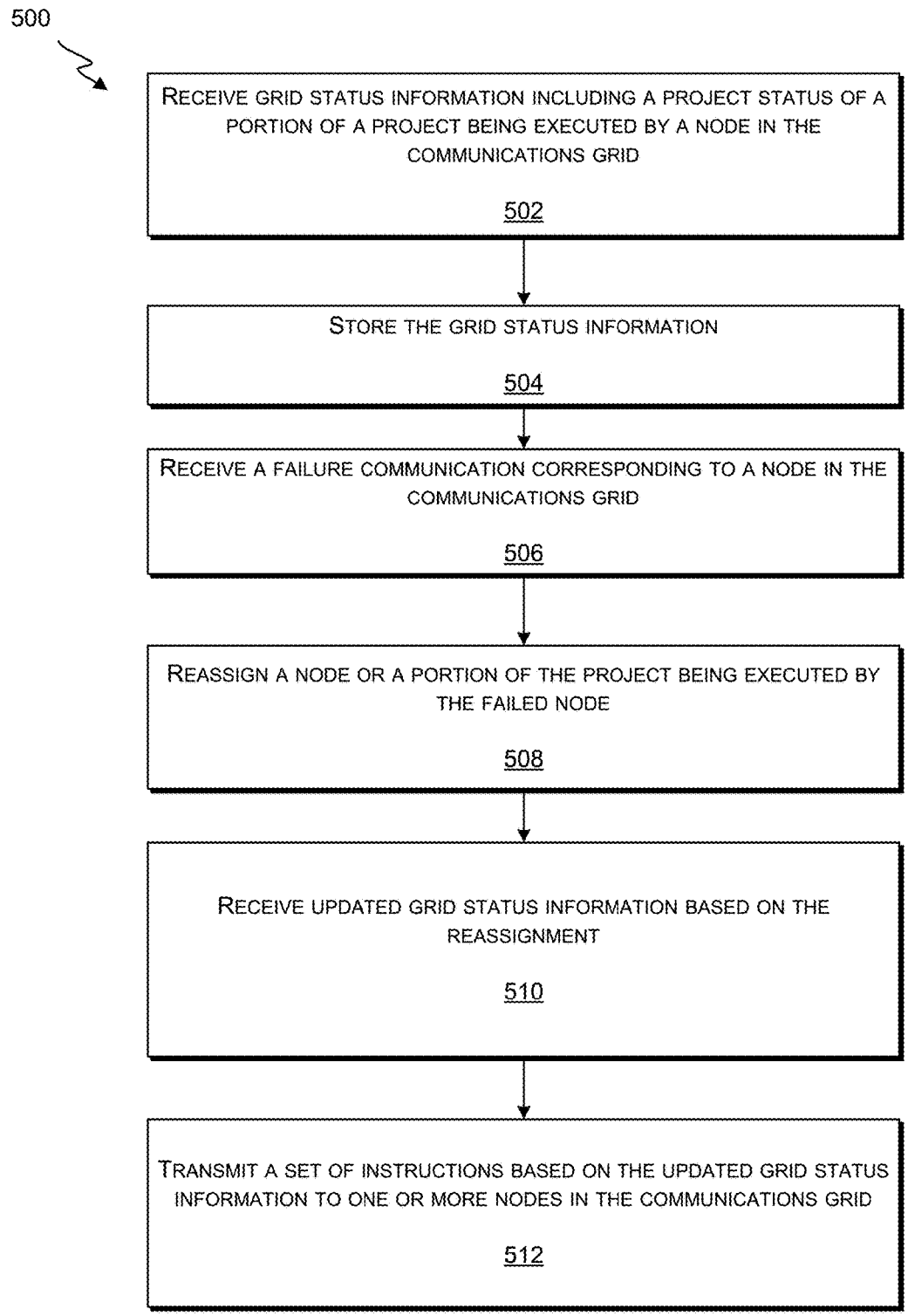
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
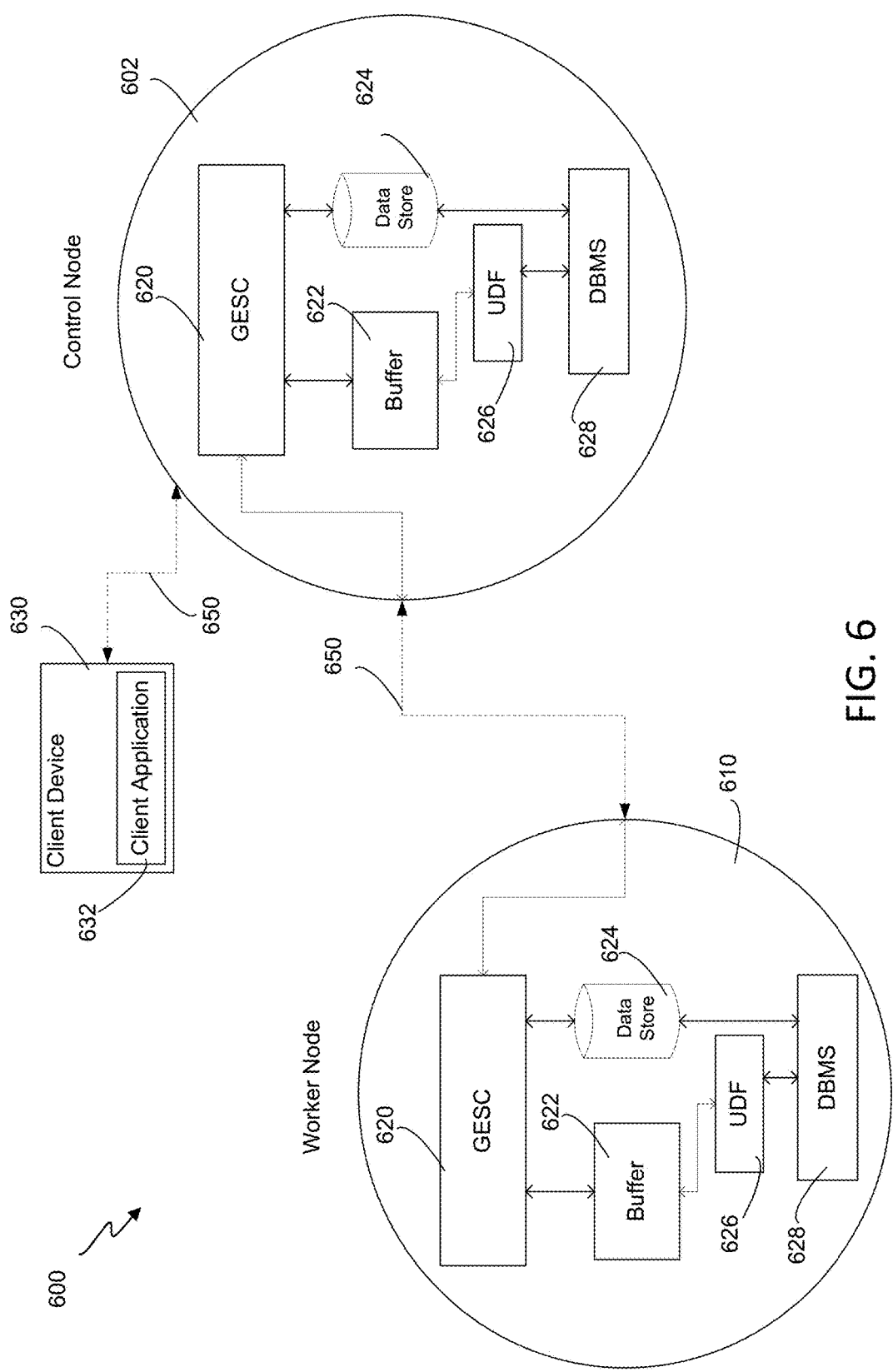
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within a memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
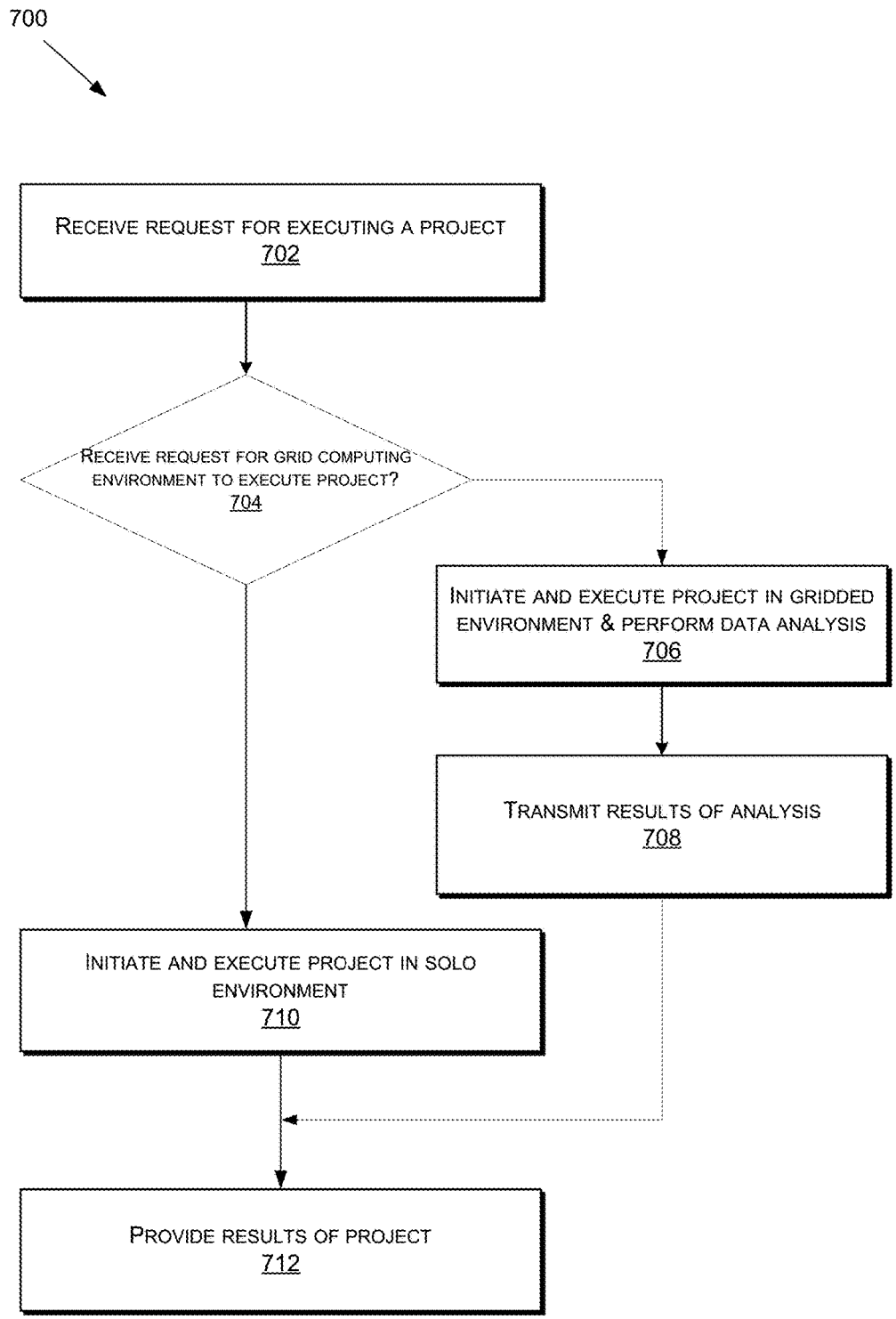
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 804, subscribing client B 806, and subscribing client C 808 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
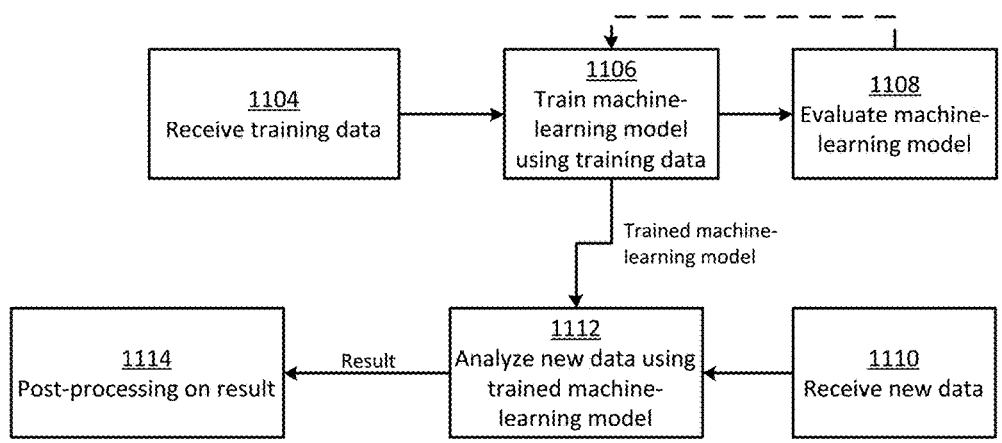
FIG. 11 illustrates a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
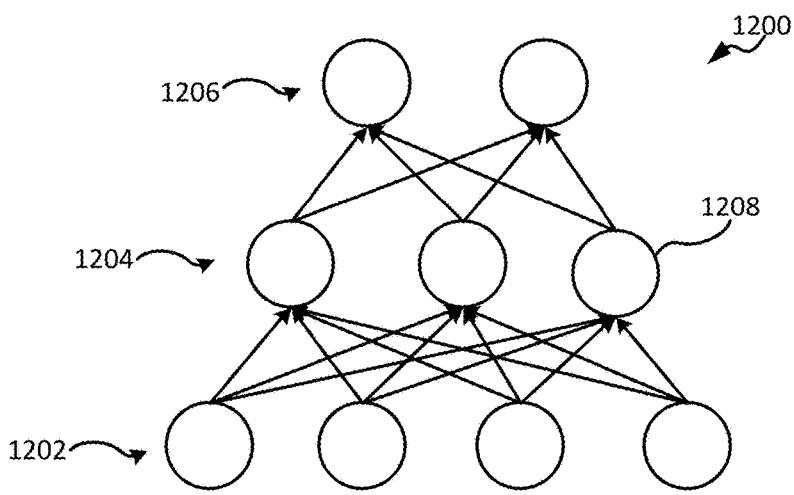
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

In a single-resource capacity control problem, the goal is to optimally allocate a finite capacity of a given resource among different classes of requestors of the resource, each of which may be associated with a different value, in order to maximize the value over the requestors. For example, requestor "A" might arrive first and offer a value of "1" for a unit of the resource. A scheduler needs to determine whether to accept A's offer of 1, or hold capacity for future demand classes (e.g., a requestor "B" in a higher demand class might arrive in the future and offer a value of "2" for a unit of the resource; if the scheduler cannot accommodate both A and B, it would be preferable to reject A's offer and accept B's offer).

If only two demand classes are considered, a relatively straightforward solution exists to maximize the total value of the resource allocation. When more demand classes are included, the problem becomes more difficult (e.g., in polynomial time). Under real-world conditions, the problem may quickly become intractable.

For instance, some requestors may request a unit of the resource and then fail to use it. This may involve, for instance, the requestor failing to use the resource (a "no-show") or may retract their request for the resource (a "cancellation"). Cancellations and no-shows are referred to collectively as "wash," and may sometimes be associated with a value loss percentage (in which a certain portion of the proffered value is lost). When the wash probabilities can differ from requestor to requestor (or between different classes of requestors, as tends to be the case in practice), the dimensionality of the problem space increases exponentially, thus making it very difficult to efficiently determine the optimal decision for maximizing value at any given point in time.

Exemplary embodiments described herein relate to the problem of allocating a finite number of units of a resource (i.e., the resource's capacity) among requestors willing to offer different amounts of value for the resource, with the goal of maximizing the total value among the requestors. As noted above, when different classes of requestors are permitted to cancel the request or fail to show up to collect the unit of the resource with different probabilities (collectively referred to as "wash"), the problem becomes difficult to solve efficiently.

More specifically, the resource allocation problem can be solved optimally using dynamic programming techniques. When all classes of requestors have the same wash probability, the dynamic programming formulation has a 1-dimensional state space and can be solved reasonably fast (as the system only needs to keep track of the total number of accepted requests or the remaining capacity of the resource). When different classes of requestors have different wash probabilities, the system must further track the number of accepted requests from each class. Such a procedure becomes computationally intractable as the number of classes grows.

The problem may be compounded by the possibility of overallocation. Given that some requestors may fail to consume their units of the resource, the scheduler may choose to book more units of the resource than are actually available, under the assumption that some wash will occur and leave units of the resource available for other requestors. However, this also opens the possibility that more requestors will attempt to claim the units of the resource than units actually exist. In this case, a penalty may be associated with failing to provide the requested units, which must be accommodated for when determining the optimal allocation levels.

According to the procedures described herein, the capacity is artificially inflated to offset the impact of wash, and then protection levels are computed using the inflated capacity as if there was no wash. More specifically, an overbooking limit is first determined based on a weighted average wash probability and a value loss percentage among currently-accepted demand. The overlooking limit is then used to inflate the capacity, and the protection levels are computed based on the inflated capacity. The protection levels are then used to determine new weighted averages, which results in a new overbooking limit. The process is repeated until the results converge, a maximum number of iterations are reached, or a maximum amount of time elapses. Using this procedure, overallocation limits and protection levels can be computed in real-time, and accordingly the resource can be allocated efficiently as new requests are received.

Examples of the types of problems that can be efficiently solved with these techniques include allocating scheduling computing resources (e.g., processor power, memory, bandwidth, etc.) in a shared computing service, assigning allocating seats on a single-leg flight to different fare classes, booking hotel rooms to different rate classes, selling show tickets to different customer segments, offering automobile rentals, cruise line seats, apartment rentals, automobile parking spaces, etc.

Jobs and Scheduling

Figure 13:
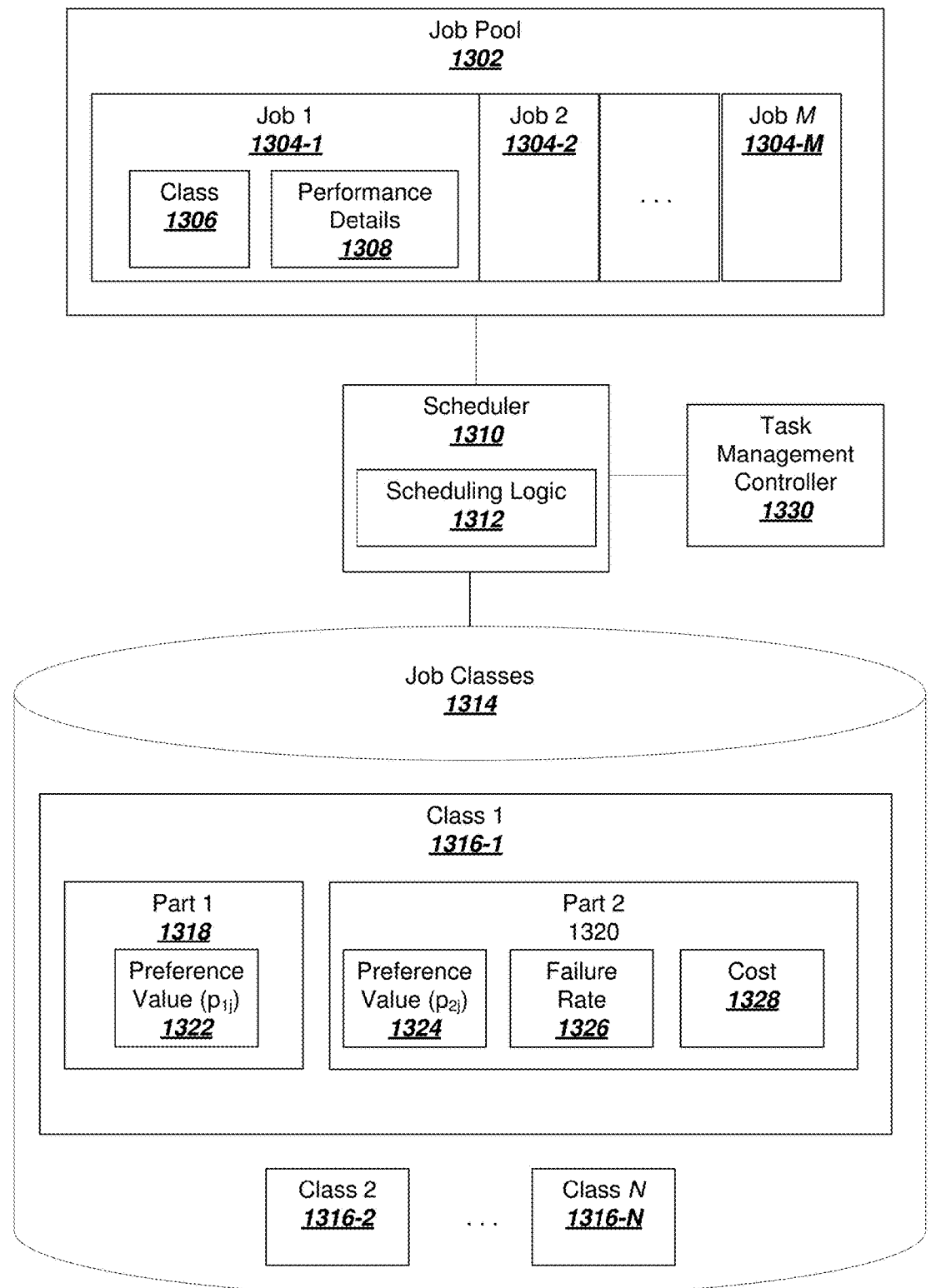
FIG. 13 illustrates an exemplary environment in which a scheduler accepts or rejects jobs.

FIG. 13 depicts an exemplary environment in which an embodiment of the above-described scheduler 1310 may be employed. The scheduler may include scheduling logic 1312 for performing a method for determining one or more parameters associated with selecting requests to be serviced; in this example the requests are in the form of jobs 1304-$i$ selected from a job pool 1302. Each of the jobs 1304-$i$ may require one or more units of a resource in order to be completed. For example, the jobs 1304-$i$ may represent requests to allocate computing resources, requests for a seat on an airplane, requests for rental cars, request for hotel rooms, etc. In one embodiment, the logic 1312 may include logic similar to that depicted in FIG. 15.

Each job 1304-$i$ may be associated with a job class 1306 indicating a group to which the job or job requestor belongs. The class 1306 may define or may be associated with a value representing an amount that the job's requestor is willing to offer for the unit(s) of the resource needed to complete the job.

Optionally, each job 1304-$i$ may be associated with job performance details 1308. The performance details 1308 may include any information needed by the scheduler 1310 for scheduling the job (e.g., a requested time at which computing resources are to be allocated, a requested flight to be booked, a requested hotel in which a room is requested, a class of car to be rented, payment details, etc.).

The scheduler 1310 may also have access to a repository 1314 of job classes, which provides information about the value and other parameters associated with each class of job. The class 1306 of the job 1304-$i$ may be matched against the corresponding class 1316-$i$ stored in the repository to determine value and parameter information. Each class may optionally be associated with a probability distribution $F_j(\cdot)$ describing a number of jobs for each class j. Thus, although the scheduler does not know how many jobs of each class will arrive, it can estimate probabilistically how many jobs of a given class are likely to be presented. The scheduler may decide to reject some jobs for a given job class in hopes of accepting more preferable jobs in a future job class. For each time instance the scheduler 1310 may decide which jobs 1304-$i$ to accept and which jobs to reject. Job classes may arrive in sequential order (i.e., all jobs of class a arrive first, followed by all jobs of class b, etc.; this would be analogous, for example, to airline bookings, in which tickets purchased closer to the departure date incur an increased cost).

In some cases, the job may come in two parts: a first part 1318 having a first preference value 1322 ($p_{1,j}$). In some embodiments, the first part 1318 is guaranteed to succeed if accepted and does not consume a unit of the resource. A second part 1320 may be associated with a second preference value 1324 ($p_{2,j}$). The second part 1320 may optionally fail at a known failure rate 1326. If the second part 1320 succeeds, the job consumes a unit of the resource. If the second part 1320 fails, the job does not consume a unit of the resource.

The first preference value 1322 and the second preference value 1324 may be represented as a single preference value with a cost 1328, representing an amount of the total value ($p_{1,j}+p_{2,j}$) that will be lost if the second part 1320 should fail (e.g., in the case of an example complete-loss situation, the cost 1328 may be 100% of the sum of the first preference value 1322 and the second preference value 1324; in the event of a no loss, the cost 1328 may be 0; in some cases, the scheduler may keep the first preference value 1322 but may lose the second preference value; in others, the scheduler may keep a percentage of the first and/or second preference values, depending on the conditions under which the failure occurred). When deciding whether to accept one of these two-part jobs, both job parts are to be accepted or rejected simultaneously.

One example of this type of two-part job is a computing system that compiles source code and then transmits the compiled code over a network if the compilation succeeds. The resource, in this example, may be units of network bandwidth, and the requestors (e.g., code providers) may offer to pay a certain price for compilation (the first preference value 1322) and network distribution (the second preference value 1324). The first part 1318 (i.e., compilation) does not use any network resources and always incurs a cost in the form of the first preference value 1322. The second part 1320 (i.e., network transmission) will occur only upon a successful compilation. Based on historic records, it may be known how often compilation succeeds or fails; thus, a failure rate 1326 may be known. If some or all of the cost is refunded upon compilation failure, this may represent the cost 1328. For example, a code provider may pay a compilation price, which is collected up front. If the code does not successfully compile, the compilation price may be partially or fully returned to the code provider (representing the cost 1328). On the other hand, if the code does successfully compile, the code is transmitted via the network and the compilation price is collected in full.

Another example of this type of two-part job is a hotel booking. A requestor may book a room (the first part 1318 of the job) and pay a deposit (the first preference value 1322). If the requestor actually shows up on the designated check-in date, then the requestor may pay the remaining balance (the second preference value 1324).

This example also serves to illustrate how different classes of requestors can be accommodated. For instance, people who book early may tend to be vacationers who pay a relatively low rate for a room. People who book later may tend to be business travelers who pay a relatively higher rate for the room. The vacationer class may be associated with a relatively low wash rate (the failure rate 1326), whereas the business class may be associated with a different, relatively higher wash probability. If the requestor does not show up on the check-in date (or cancels ahead of time), the requestor may incur a cost 1328 by forfeiting their deposit (the first preference value 1322) even though the requestor does not need to pay the balance (the second preference value 1324).

Yet another example would be booking an airline seat for a given flight. The airline seat may be associated with many different types of fare classes and may be overbooked based on historical cancellation and no-show records. Moreover, if a flight is overbooked and a given traveler cannot be accommodated, the booking airline may be forced to pay a penalty to the traveler.

Since some jobs may fail in the final part and leave their processing capacity unused, the scheduler may decide to accept more jobs than there is processing capacity. An upper bound may be placed upon the maximum number of jobs accepted by the scheduler in any time instance. The scheduler 1310 may not know whether or not a job will fail in the final part or not; however, for a given job class j it does know the probability $q_j$ that the job will succeed and require a computing resource.

The goal of the scheduler 1310 is to maximize the combined preference values 1322, 1324 of completed job-parts. If there is not enough processing capacity to satisfy the accepted jobs, congestion occurs and a penalty is incurred since accepted jobs may not be completed in the allotted time. Alternatively, other criterion, such as maximizing processor utilization, may be used instead.

The scheduler 1310 may output one or more parameters that allow a task management controller 1330 to determine whether to accept a given job or not. For example, the parameters may include an amount of overallocation that may be tolerated (such that the task management controller knows that it should not allocate more units of the resource than are accounted for by the overallocation limit) and a protection level for each class, indicating how much of the capacity should be reserved for probable future requestors. Overallocation refers to the practice of accepting more reservations than the capacity of the resource (i.e., the finite number of units into which the resource is broken up, which are available for allocation to requestors), and allows a scheduler to mitigate the impact of wash. An overallocation limit is the difference between the maximum number of reservations allowed, and the resource capacity. The overallocation limit may be variable (and the procedures below may adjust the overallocation limit at various stages), but may be subject to an upper bound, above which the overallocation limit is not allowed to vary.

Based on information provided to it, the task management controller 1330 may instruct the scheduler 1310 whether to accept or reject the currently-presented job 1304-$i$.

Terminology

Figure 14:
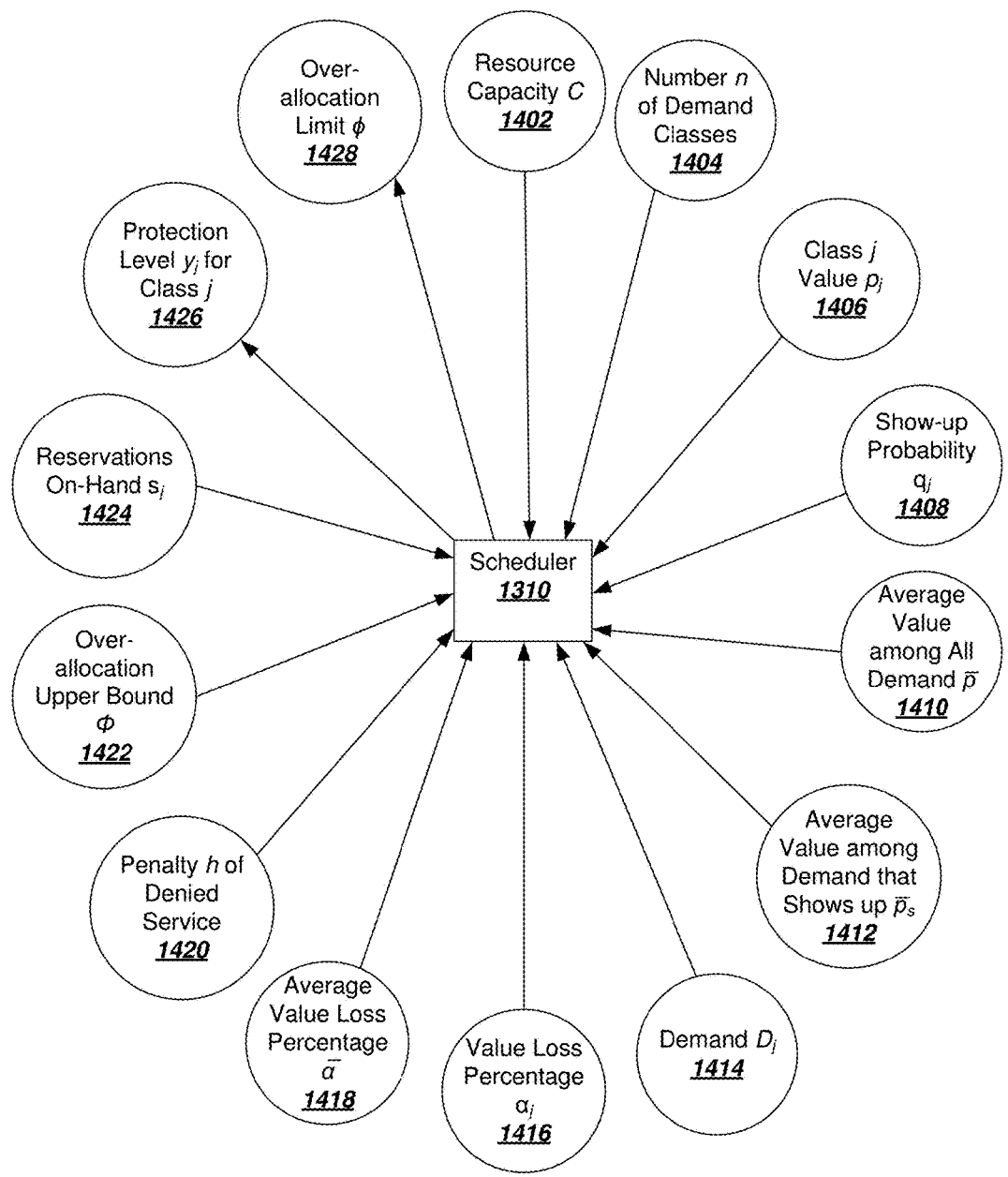
FIG. 14 illustrates exemplary inputs to, and outputs from, the scheduler.

As already alluded to, the scheduler 1310 takes in a number of values and outputs a number of values. These inputs and outputs are summarized in FIG. 14.

The scheduler 1310 may take, as an input, a total resource capacity 1402 (C), representing the number of units of the resource that are actually available to be consumed.

The scheduler 1310 may further accept as an input the number n of demand classes. In the convention adopted herein, a demand class j may arrive before the demand class j-1, which may arrive before the demand class j-2, etc.

For each class, the scheduler 1310 may accept a value 1406 $p_j$, representing the preference value of class j. In some cases, a class j may be associated with more than one preference value (e.g., a first preference value $p_{1j}$ for a first part of a class job, and a second preference value $p_{2j}$ for a second part of a class job), which may be represented as a single preference value $p_j$ with an associated cost or value loss percentage. In any of the embodiments discussed below, an adjusted value $\tilde{p}_j$ may be substituted for the preference value $p_j$. The adjusted value may be determined based on Equation (1):

$$\tilde{p}_j = p_j[1-(1-\omega)(1-q_j)] + p_j(1-q_j)(1-\alpha_j) \qquad \text{Eq. (1)}$$

where $$\omega = \min\left\{1, \frac{\Phi}{\phi^*}\right\}$$

and $\phi^*$ is the solution to Equation (2), provided below.

A rationale for using the adjusted value $\tilde{p}_j$ is discussed in § 3.2 of the above-noted '992 provisional application.

Each class may also be associated with a show-up probability 1408 $q_j$, which indicates a probability that a class j requestor will show up to claim their reservation.

An average 1410 ($\bar{p}$) represents an average value among all demand (e.g., among all requestors of all demand classes), whereas an average 1412 ($\bar{p}_s$) represents an average value among all demand (e.g., among all requestors of all demand classes) that actually show up to claim their reservations.

The demand 1414 ($D_j$) represents the demand of class j, where $D_j$~a probability distribution $F_j(\cdot)$ describing a number of jobs for each class j (j=1, 2, . . . , n; $D_i$ is independent from $D_j$ $\forall i \neq j$).

A value loss percentage 1416 ($\alpha_1$) represents a percentage of value that is lost for a class j reservation in case of a wash.

An average value loss percentage 1418 ($\bar{\alpha}$) represents the value lost when a requestor fails to show up for (or cancels) their reservation, averaged over all requestors of all demand classes.

A penalty 1420 ($h$) represents an amount of value loss in addition to losing all of the preference value associated with the requestor when the requestor has been confirmed for a unit of the resource, but the unit of the resource is not able to be provided to the requestor.

An overbooking upper bound 1422 ($\bar{\phi}$) represents a maximum value that the overbooking limit 1428 ($\phi$) is not permitted to exceed. The overbooking upper bound 1422 puts an upper limit on the risk that requestors will be offered a unit of the resource which cannot be supported or provided.

A number ($s_j$) of reservations current on-hand 1424 represents a number of reservations currently on hand for class j (j=1, 2, . . . , n).

Based on this information, the scheduler 1310 outputs a protection level 1426 ($y_i$) for the currently-evaluated class j, which represents an amount of capacity to reserve for classes j, j-1, . . . , 1 when accepting demand for class j+1

(j=n−1, n−2, . . . , 1). The scheduler also outputs an overallocation limit 1428 ($\phi$) representing an amount of reservations the scheduler will currently tolerate above the capacity C of the resource, in order to mitigate the effects of wash.

In calculating these outputs, the scheduler 1310 may further make use of a number of intermediate variables. To that end, the value x, as used below, is a state variable representing the amount of remaining capacity. The value u represents a number of accepted requestors from the demand class that is currently arriving. The value $V_j(x)$ represents a maximum expected future value at the beginning of stage j, i.e. when class j demand starts arriving, with remaining capacity x. Let $D(C+\phi)$ represent the net capacity utilization when the overallocation limit is reached.

Finally, let iv, represent the expected capacity utilization from class j (j=1, . . . , n), and let r be the expected total value when the units of the resource are allocated given certain protection levels $y_j$.

Exemplary Logic

Figure 15:
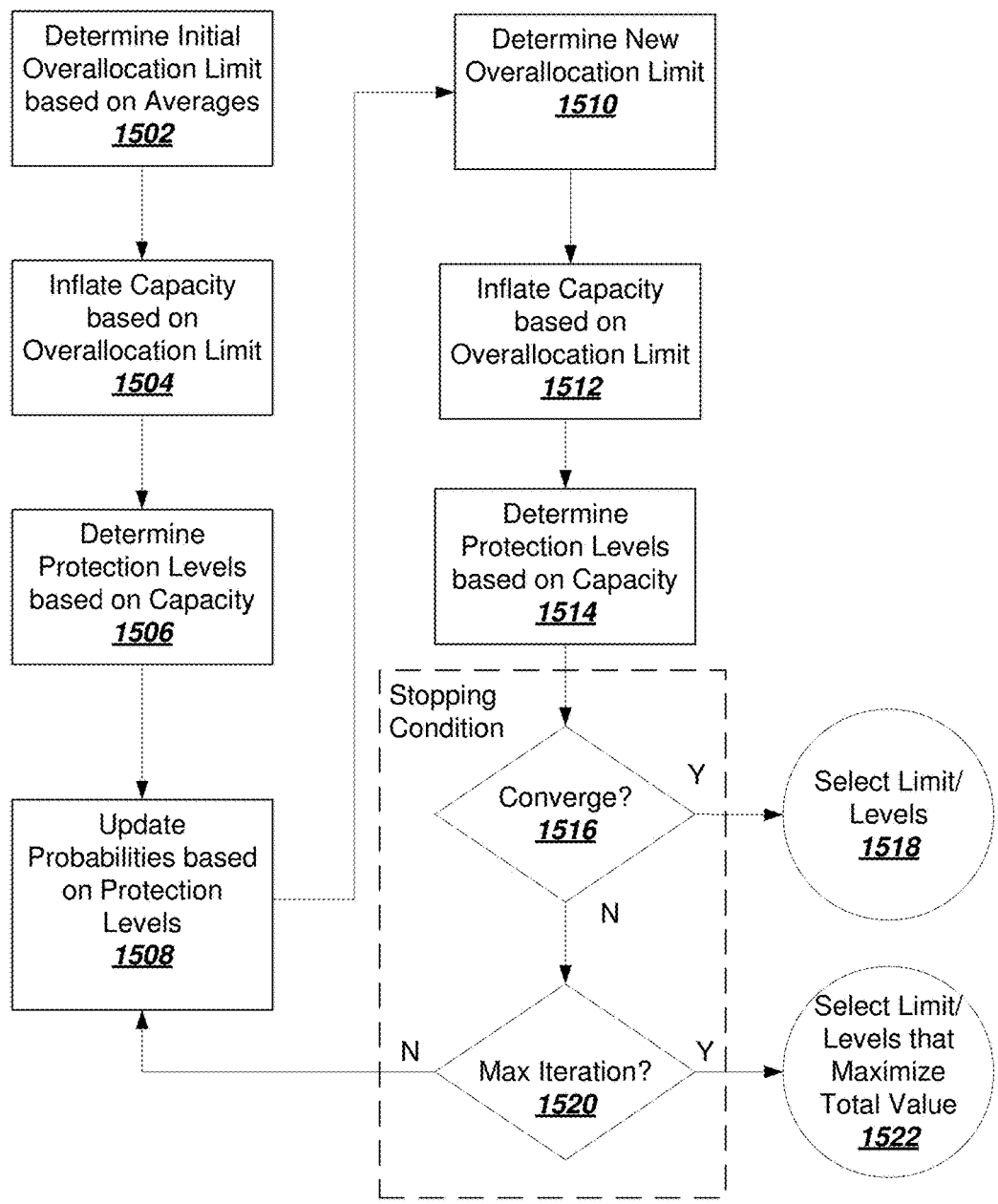
FIG. 15 illustrates a flow chart of an example of a process for setting parameters that define whether the scheduler should accept or reject a given job.

FIG. 15 is a flowchart illustrating exemplary logic for setting parameters that allow a job scheduler and task management controller to decide whether or not to accept a request from an incoming requestor while attempting to maximize overall value for the units of the resource.

The logic of FIG. 15 may be embodied as instructions stored on a non-transitory computer-readable medium and executable on one or more hardware processors. The instructions may be performed by a system including such a non-transitory medium and the processors. Such a system may be, for example, a personal computer, a server, a mainframe, a mobile device, etc.

At block 1502, the system may determine an initial overallocation limit $\phi_0$. The initial overallocation limit may be determined by solving Equation (2), below, using simple averages for $\bar{p}$, $\bar{p}_s$, and $\bar{\alpha}$. The averages may be obtained, for example, based on historical records of preference values associated with different classes of requestors and wash probabilities, or may be based on estimates of these values if no such historical records exist.

$$\bar{p}E[D(C+\phi)]+\bar{p}(1-\bar{\alpha})E[C+\phi-D(C+\phi)]- \\ (\bar{p}_s+h)E[(D(C+\phi)-C)^+] \qquad \text{Eq. (2)}$$

The optimal overallocation limit may be obtained by maximizing the expected total value of Equation (2).

At block 1504, the system may compute a new value for the capacity based on the overallocation limit determined at block 1502. The new value for the capacity may initially represent the original capacity C representing a number of units of the resource, plus the initial overallocation limit $\phi_0$ determined in block 1502. In other words, the initial capacity C is artificially inflated as though the resource capacity included the initial overallocation limit $\phi_0$, in addition to the actual units of the resource.

At block 1506, the system determines initial protection levels $y_{j0}$ (j=1, . . . n−1) based on the inflated capacity determined at block 1504. In other words, for each class j, the system sets an initial protection level $y_{j0}$ as though the capacity were $C+\phi_0$. This may be achieved by solving Equation (3):

$$V_j(x) = E\left[\max_{0 \leq u \leq \min\{D_j, x\}} \{p_j u + V_{j-1}(x-u)\}\right] \qquad \text{Eq. (3)}$$

with boundary conditions defined by Equation (4):

$$V_0(x)=0, x=0,1, \ldots, C \qquad \text{Eq. (4)}$$

using the above-described substitution of $\tilde{p}_j$ for the preference value $p_j$ (see Equation (1)).

At block 1508, the system may update the averages for $\bar{p}$, $\bar{p}_s$, and $\bar{\alpha}$ based on the protection levels determined in block 1506. Because the protection levels $y_{j0}$ may cause requests to be denied for some relatively lower value requestors (reserving that demand availability for relatively higher value requestors), the average value among all demand $\bar{p}$ may change. Moreover, since each demand class may have a different wash probability, as discussed above, and the protection levels $y_{j0}$ change the expected makeup of the different demand classes among allocated units of the resource, the average value among demand that shows up $\bar{p}_s$, and the average value loss percentage $\bar{\alpha}$, may also change.

These values may be updated based on the new expected makeup of the classes among the allocated units of the resource, given the units reserved for those different classes through the initial protection levels $y_{j0}$. To accomplish this, for a class j the value for the expected capacity utilization $w_j$ for the class may be determined as:

$$w_j = E[\min\{D_j, C+\phi-y_{j-1}-\Sigma_{k=j+1}^{n+1} w_k\}] \qquad \text{Eq. (5)}$$

with boundary condition defined by equation (5.1)

$$w_{n+1}=0 \qquad \text{Eq. (5.1)}$$

The expected total value r may then be updated based on Equation (6):

$$r=r+p_j w_j \qquad \text{Eq. (6)}$$

The above determination and updating may be performed and repeated for each class j (j=n, . . . 1).

Using Equations (5) and (6), the expected capacity utilization $w_j$ and the total value r can be computed given the protection levels $y_{j0}$ as determined in block 1506. Using the expected capacity utilization $w_j$ for each class j, the class-specific makeup of the allocated units of the resource may be determined. Using this class-specific makeup, the averages for $\bar{p}$, $\bar{p}_s$, and $\bar{\alpha}$ can be determined.

The above-described procedure then repeats with the new values for $\bar{p}$, $\bar{p}_s$, and $\bar{\alpha}$ at blocks 1510-1514, incrementing the value of i with each repetition (where i represents the iteration number). In other words, at block 1510, a new overallocation limit $\phi_i$ is determined in the same manner as $\phi_0$ was determined in block 1502, but using the updated averages for $\bar{p}$, $\bar{p}_s$, and $\bar{\alpha}$. At block 1512, a new capacity $C+\phi_i$ is determined using the new overallocation limit $\phi_i$ computed in block 1510. At block 1514, new protection levels $y_{ji}$ (j=1, . . . n−1; where $y_{ji}$ represents the protection level for class j during iteration i) are determined based on the new capacity $C+\phi_i$ using the technique described above in connection with block 1506. Using the new protection levels $y_{ji}$, the expected capacity utilization $w_j$ and the total value $r_i$ may be computed for the current round i.

The system may determine whether the new protection levels $y_{ji}$ result in an improved (e.g. greater) total value $r_i$ as compared to the total value $r_{i-1}$ from the previous round. If so, then the new overallocation limit $\phi_i$ represents an improvement over the previous overallocation limit $\phi_{i-1}$, and the value of the current overallocation limit $\phi_i$ may be stored as $\phi^*$. Similarly, the current protection levels $y_{ji}$ that resulted from the current overallocation limit $\phi_i$ may be stored as $y_j^*$.

Each time the protection levels $y_{ji}$ are updated in block 1514, the system then evaluates whether a stopping condition has been reached. A number of different stopping conditions are possible (e.g., a certain amount of time may be allotted to reach a solution, with the best solution discovered before the time elapses being used to allocate the resource). In the example in FIG. 15, system is configured to stop updating the protection levels $y_{ji}$ when the protection levels converge (i.e., when the protection levels between two iterations i, i−1 are the same, or are within a predetermined threshold value of each other). At block 1516, the currently-determined protection levels $y_{ji}$ are compared to the protection levels $y_{ji-1}$ as determined in the previous round of determinations. The system may also evaluate whether the overallocation limit $\phi_i$ reached in the current round i is the same as (or within a predetermined threshold value of) the overallocation limit $\phi_{i-1}$ reached in the previous round.

If these values are found to converge at block 1516, then processing may be complete. At block 1518, the estimated optimal overallocation limit $\phi^*$ and estimated optimal protection levels $y_j^*$ may be returned to the task management controller, which uses these values to determine whether to accept a currently pending job request. Given the current number of bookings, the task management controller may determine if there remain resource units available (given the overallocation limit $\phi^*$). If so, the task management controller may determine if all of those resource units are reserved for future demand, given the protection levels $y_j^*$. If not (i.e., some units of the resource, with the possibility of overallocating, remain available for the current class of requestors), then the task management controller may accept the request or may instruct the scheduler to accept the request. Otherwise, the request may be denied.

If the values do not converge at block 1516, then processing may proceed to block 1520. Because the values may never converge, block 1520 acts as a failsafe, ending processing after a maximum number of iterations through blocks 1510-1514. If the maximum iteration has been reached, then the current values for the estimated optimal overallocation limit $\phi^*$ and estimated optimal protection levels $y_j^*$ may be returned to the task management controller. Otherwise, processing returns to block 1508, and the averages for $\bar{p}$, $\bar{p}_s$, and $\bar{\alpha}$ may be updated given the current protection levels $y_{ji}$, and blocks 1510-1514 may repeat until convergence is reached, or the maximum number of iterations has been achieved.

Analysis

Because the above-described procedure represents a heuristic that attempts to approximate an optimal solution, it is desirable to evaluate its performance and determine how well the procedure approximates the best solution. FIGS. 16A-16F illustrate the performance of the above-described logic under testing conditions, given certain settings. In each scenario, the expected value generated by the above-described procedure (r) is compared to the expected value generated by the optimal policy (r*). Determination of the optimal policy r* is described in § 4 of the above-noted '992 application.

1000 simulations were run. The performance of the above-described procedure as compared to the optimal solution among these simulations is measured by an optimality gap, represented by:

$$\frac{r - r^*}{r^*} \times 100. \qquad \text{Eq. (7)}$$

This optimality gap represents a percentage by which the above-described solution differs from the optimal solution.

Figure 16A:
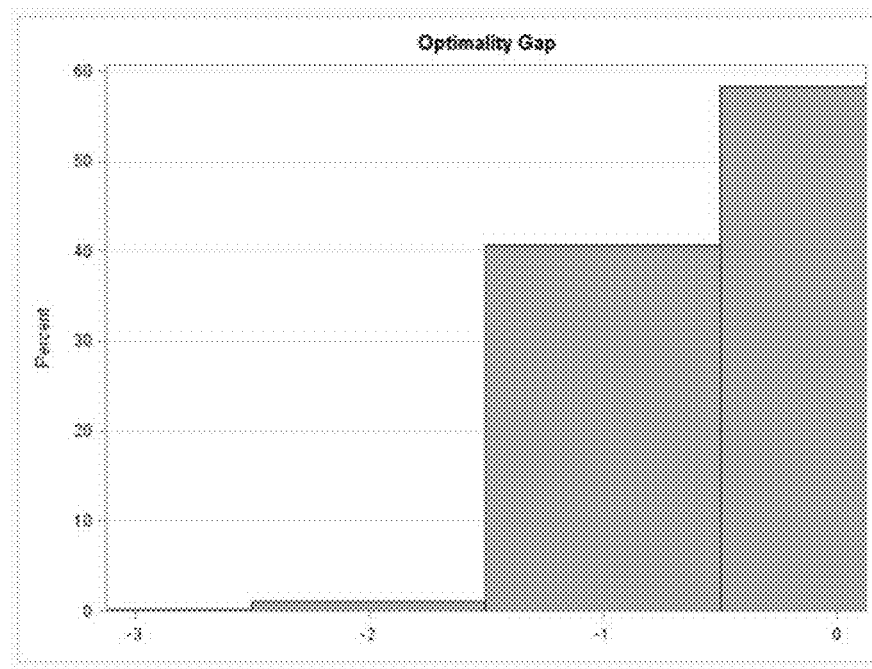
FIGS. 16A-16F illustrate graphs showing the effect of adjusting certain aspects of the process shown in FIG. 15.

FIG. 16A depicts a scenario in which the resource capacity is two-thirds of the total demand (e.g., there are 100 units of the resource and 150 requests for resource units). The overallocation upper bound $\phi$ is set to $\infty$ (i.e., there is no upper bound limiting the overallocation limit $\phi$). The value loss percentage $\alpha_1$ is set to 100 (i.e., 100% of value is lost in the case of a wash for all classes).

As shown in FIG. 16A, under these conditions the vast majority of simulations resulted in an optimality gap of less than 1%; in fact, for 90% of the instances, the optimality gap was less than 0.92%. The worst optimality gap was 2.69%, while the average optimality gap was 0.49%.

Figure 16B:
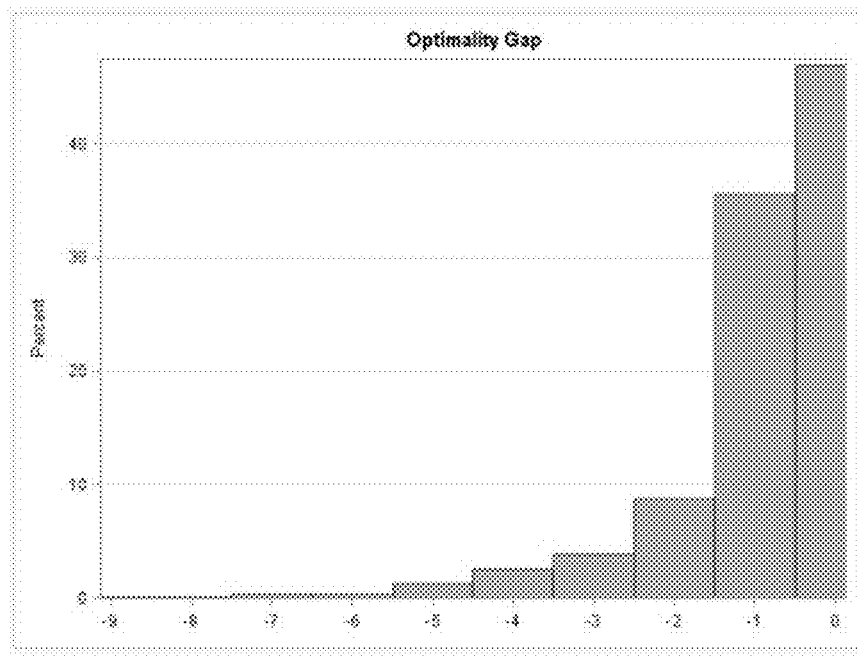

FIG. 16B shows the same scenario, but with the resource capacity set to one-third of total demand instead of two-thirds (i.e., there are twice as many requestors per unit resource in the second scenario as in the first). In this case, the average optimality gap was 0.94%, with 90% of instances falling in an optimality gap of 2.33% or less.

Figures 16C, 16D:
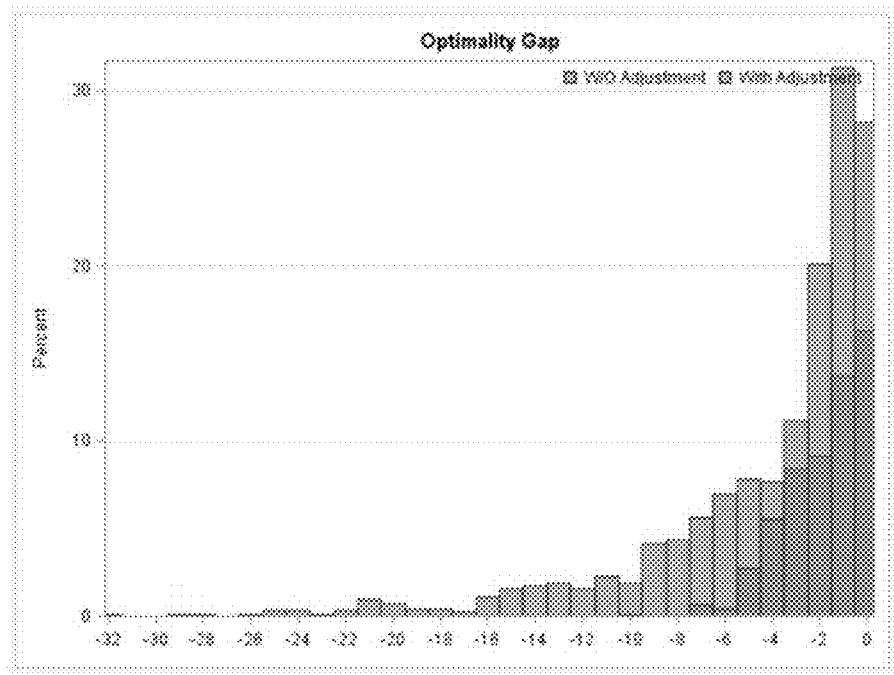

FIG. 16C shows the same scenario as FIG. 16B, but with the value loss percentage $\alpha_1$ set to 0 (i.e., value loss for wash). FIG. 16C shows two sets of data points: with the above-described value adjustment (substituting $\tilde{p}_j$ from Equation (1) for the preference value $p_j$), and without the value adjustment (i.e., using $p_j$).

Without the value adjustment, the average optimality gap was 5.2%, with 90% of observations falling under an optimality gap of 12.68%. With the value adjustment, the average optimality gap was 1.5%, with 90% of observations falling under an optimality gap of 3.42%. This demonstration shows the importance of performing this value adjustment to account for, e.g., wash and an overallocation upper bound.

FIG. 16D depicts a scenario similar to Scenario 1 from FIG. 16A (resource capacity at two-thirds of demand, value loss percentage $\alpha_1$ set to 100), but does not allow for overbooking (i.e., $\Phi=0$). Once again, FIG. 16D shows results with and without the value adjustment. In this case, the average optimality gap without the value adjustment is 3%, compared to 0.54% with the value adjustment. 90% of observations fall under a 7.34% optimality gap without the adjustment, but fall under a 1.76% optimality gap with the adjustment.

Figure 16E:
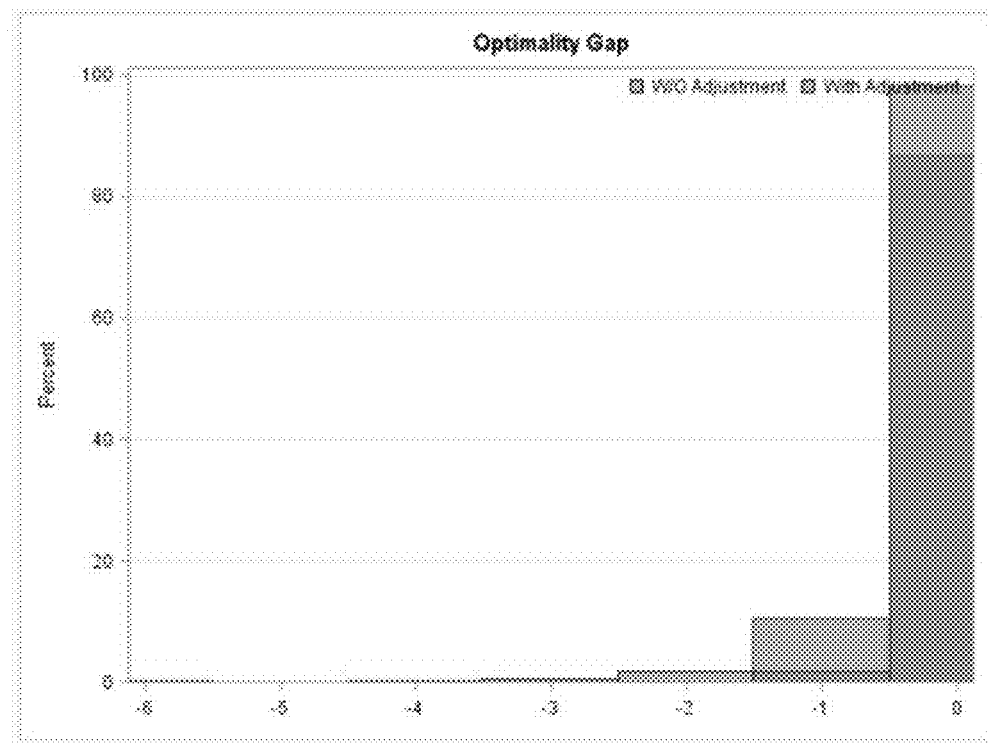

The scenario depicted n FIG. 16E sets the resource capacity at two-thirds of demand, and prohibits overallocation, and furthermore sets the value loss percentage $\alpha_j$ to 20 (i.e., a 20% value loss for wash). In this case, the average optimality gap without the value adjustment is 0.23%, compared to 0.02% with the value adjustment. 90% of observations fall under a 0.65% optimality gap without the adjustment, but fall under a 0.01% optimality gap with the adjustment.

Figure 16F:
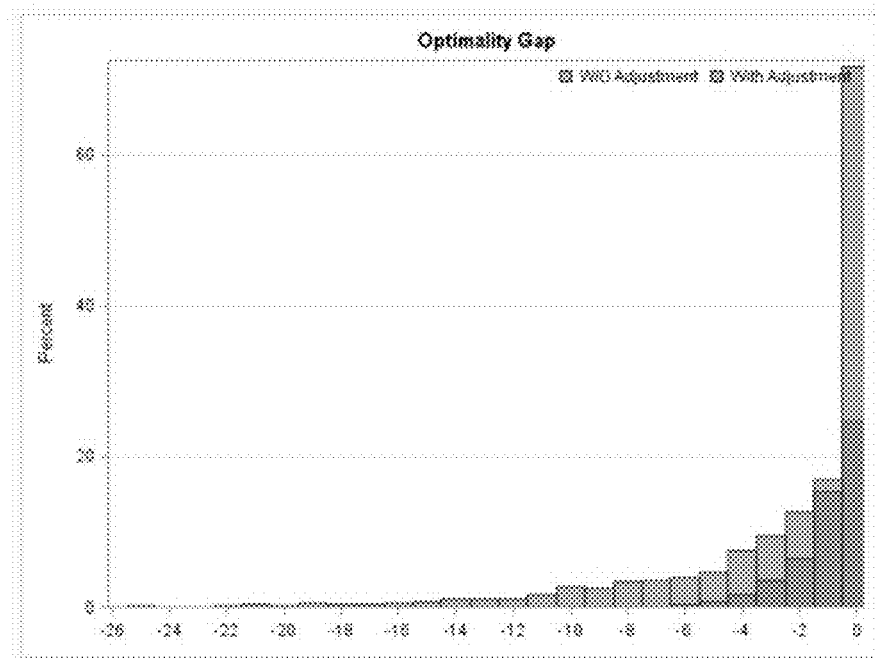

FIG. 16F sets the resource capacity at one-third of demand, sets an overallocation upper bound at 0.3$\phi^*$ (i.e., the overallocation upper bound is set to 30% of the optimal overallocation limit), and the value loss percentage is set to 100 (i.e., 100% value loss in case of wash). In this case, the average optimality gap without the value adjustment is 3.72%, compared to 0.56% with the value adjustment. 90% of observations fall under a 9.89% optimality gap without the adjustment, but fall under a 1.90% optimality gap with the adjustment.

Thus, FIGS. 16A-16F show that, although the above-described techniques may not always yield the optimal solution, they do approximate the optimal solution fairly closely. Moreover, these techniques can be applied in a much more efficient and scalable manner than conventional dynamic programming techniques, which means that accept/reject decisions can be made in real-time or near-real-time, as requests are received.

These Figures also show the importance of making the value adjustment described in connection with Equation (1) to better approximate optimal results. However, as demonstrated especially by FIG. 16E, a very reasonable solution can still be approximated without the value adjustment under certain conditions; therefore, the value adjustment can be made or not made, depending on the specifics of the scenario employed (e.g., whether overbooking is tolerated, what value loss percentage is used) and depending on the resources available to perform the calculations.

The preceding description provides example embodiments only, and is not intended to limit the scope, applicability, or configuration of the disclosure. Rather, the description of the example embodiments provides those skilled in the art with an enabling description for implementing an example embodiment. It should be understood that various changes may be made in the function and arrangement of elements without departing from the spirit and scope of the technology as set forth in the appended claims.

Specific details are given in the description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

What is claimed is:

1. A non-transitory computer-readable medium storing instructions that, when executed by one or more processors, cause the one or more processors to provide a task management controller configured to allocate units of a resource having a predetermined capacity to different classes of requestors, each class having a distinct probability of failing to use an allocated unit of the resource and being associated with a value collected when a member of the class is assigned or consumes the allocated unit of the resource, the instructions comprising instructions for:
   (1) determining an overallocation limit representing an upper limit to which the resource may be overallocated
   (2) inflating the predetermined capacity by adding the overallocation limit determined in (1) to the capacity;
   (3) determining a protection level for each of the different classes based on the inflated capacity, the protection level defining an amount of capacity to reserve for future requests for resources and being determined by maximizing an expected value for the different classes that arrive in the future given an amount of capacity allocated to a current class and a number of the different classes;
   (4) updating, based on the protection levels determined in (3), each of the probability that the requestor fails to use the allocated unit of the resource and the average value loss in the event that the requestor fails to use the allocated unit of the resource;
   (5) repeating (1)-(4) until a stopping condition is reached; and
   providing the values of the overallocation limit and the protection levels set at a time the stopping condition is reached to the task management controller, the task management controller determining whether to allocate a unit of the resource to a requestor from the current class based on whether the overallocation limit has not yet been reached and based on whether capacity remains under the protection level.

2. The medium of claim 1, wherein the stopping condition is one or more of a maximum number of iterations of (1)-(4) or a predefined maximum amount of time allowed to elapse while repeating (1)-(4).

3. The medium of claim 1, wherein the stopping condition occurs when one or more of the overallocation limit or the protection levels converge to within a predetermined threshold range between subsequent iterations of (1)-(4).

4. The medium of claim 1, wherein the values of the overallocation limit and the protection levels are determined substantially in real-time as requests for units of the resource are received.

5. The medium of claim 1, wherein the overallocation limit is limited by a predetermined overallocation upper bound.

6. The medium of claim 1, wherein request for a unit of the resource occurs in two parts comprising:
   a first part that does not consume any of the resource and is associated with a first preference value; and
   a second part associated with a second preference value, the second part being capable of succeeding or failing, wherein the protection levels are determined, at least in part, based on the first preference value and the second preference value
   and further storing instructions for:
      determining whether the second part succeeds or fails;
      based on the determination, consuming a unit of the resource if the second part succeeds, or
      failing to consume a unit of the resource if the second part fails.

7. The medium of claim 6, wherein the second part is associated with a value loss in the event of a failure of the second part.

8. The medium of claim 6, wherein the task management controller is configured to attempt to maximize a sum of the first preference value and the second preference value for the requestors.

9. The medium of claim 1, wherein a penalty is associated with allocating a unit of the resource but failing to provide the unit of the resource, at least one of the overallocation limit or the protection levels being determined at least in part based on the penalty.

10. The medium of claim 1, wherein the overallocation limit is initially determined by:
   (a) determining an average wash probability representing a probability among the requestors that the requestors fail to use the allocated unit of the resource, averaged over the requestors, based on historical wash probabilities for the resource among the classes of requestors, (b) determining an average value loss representing an amount of value lost in an event that a given requestor fails to use the allocated unit of the resource, averaged over the requestors, based on historical value loss percentages or a preconfigured default value, (c) using the average wash probability and the average value loss to determine an estimated total value lost among requestors that are predicted to fail to use the allocated unit of the resource, (d) using the average wash probability and a probability distribution representing a quantity of demand for the units of the resource to determine an estimated net capacity utilization, (e) determining an average value representing a value among the requestors that are predicted to show up to utilize the allocated unit of the resource given the net capacity utilization; and (f) adjusting the overallocation limit to maximize an expected value among the different classes of requestors, based at least in part on the average value as determined in (e) and the estimated total value lost as determined in (c).

11. A method for providing a task management controller configured to allocate units of a resource having a predetermined capacity to different classes of requestors, each class having a distinct probability of failing to use an allocated unit of the resource and being associated with a value collected when a member of the class is assigned or consumes the allocated unit of the resource, the method comprising:

(1) determining an overallocation limit representing an upper limit to which the resource may be overallocated (2) inflating the predetermined capacity by adding the overallocation limit determined in (1) to the capacity;

(3) determining a protection level for each of the different classes based on the inflated capacity, the protection level defining an amount of capacity to reserve for future requests for resources and being determined by maximizing an expected value for the different classes that arrive in the future given an amount of capacity allocated to a current class and a number of the different classes;

(4) updating, based on the protection levels determined in (3), each of the probability that the requestor fails to use the allocated unit of the resource and the average value loss in the event that the requestor fails to use the allocated unit of the resource;

(5) repeating (1)-(4) until a stopping condition is reached; and providing the values of the overallocation limit and the protection levels set at a time the stopping condition is reached to the task management controller, the task management controller determining whether to allocate a unit of the resource to a requestor from the current class based on whether the overallocation limit has not yet been reached and based on whether capacity remains under the protection level.

12. The method of claim 11, wherein the stopping condition is one or more of a maximum number of iterations of (1)-(4) or a predefined maximum amount of time allowed to elapse while repeating (1)-(4).

13. The method of claim 11, wherein the stopping condition occurs when one or more of the overallocation limit or the protection levels converge to within a predetermined threshold range between subsequent iterations of (1)-(4).

14. The method of claim 11, wherein the values of the overallocation limit and the protection levels are determined substantially in real-time as requests for units of the resource are received.

15. The method of claim 11, wherein the overallocation limit is limited by a predetermined overallocation upper bound.

16. The method of claim 11, wherein request for a unit of the resource occurs in two parts comprising:
a first part that does not consume any of the resource and is associated with a first preference value; and
a second part associated with a second preference value, the second part being capable of succeeding or failing, wherein the protection levels are determined, at least in part, based on the first preference value and the second preference value
and further storing instructions for:
determining whether the second part succeeds or fails;
based on the determination, consuming a unit of the resource if the second part succeeds, or
failing to consume a unit of the resource if the second part fails.

17. The method of claim 16, wherein the second part is associated with a value loss in the event of a failure of the second part.

18. The method of claim 16, wherein the task management controller is configured to attempt to maximize a sum of the first preference value and the second preference value for the requestors.

19. The method of claim 11, wherein a penalty is associated with allocating a unit of the resource but failing to provide the unit of the resource, at least one of the overallocation limit or the protection levels being determined at least in part based on the penalty.

20. The method of claim 11, wherein the overallocation limit is initially determined by:

(a) determining an average wash probability representing a probability among the requestors that the requestors fail to use the allocated unit of the resource, averaged over the requestors, based on historical wash probabilities for the resource among the classes of requestors, (b) determining an average value loss representing an amount of value lost in an event that a given requestor fails to use the allocated unit of the resource, averaged over the requestors, based on historical value loss percentages or a preconfigured default value, (c) using the average wash probability and the average value loss to determine an estimated total value lost among requestors that are predicted to fail to use the allocated unit of the resource, (d) using the average wash probability and a probability distribution representing a quantity of demand for the units of the resource to determine an estimated net capacity utilization, (e) determining an average value representing a value among the requestors that are predicted to show up to utilize the allocated unit of the resource given the net capacity utilization; and (f) adjusting the overallocation limit to maximize an expected value among the different classes of requestors, based at least in part on the average value as determined in (e) and the estimated total value lost as determined in (c).

21. An apparatus comprising:
a processor circuit; and
a non-transitory computer-readable medium storing instructions that, when executed by the processor circuit, causes the processor circuit to provide a task management controller configured to allocate units of a resource having a predetermined capacity to different classes of requestors, each class having a distinct probability of failing to use an allocated unit of the resource and being associated with a value collected when a member of the class is assigned or consumes the allocated unit of the resource, the instructions comprising instructions for:

(1) determining an overallocation limit representing an upper limit to which the resource may be overallocated (2) inflating the predetermined capacity by adding the overallocation limit determined in (1) to the capacity;

(3) determining a protection level for each of the different classes based on the inflated capacity, the protection level defining an amount of capacity to reserve for future requests for resources and being determined by maximizing an expected value for the different classes that arrive in the future given an amount of capacity allocated to a current class and a number of the different classes;

(4) updating, based on the protection levels determined in (3), each of the probability that the requestor fails to use the allocated unit of the resource and the average value loss in the event that the requestor fails to use the allocated unit of the resource;

(5) repeating (1)-(4) until a stopping condition is reached; and providing the values of the overallocation limit and the protection levels set at a time the stopping condition is reached to the task management controller, the task management controller determining whether to allocate a unit of the resource to a requestor from the current class based on whether the overallocation limit has not yet been reached and based on whether capacity remains under the protection level.

22. The apparatus of claim 21, wherein the stopping condition is one or more of a maximum number of iterations of (1)-(4) or a predefined maximum amount of time allowed to elapse while repeating (1)-(4).

23. The apparatus of claim 21, wherein the stopping condition occurs when one or more of the overallocation limit or the protection levels converge to within a predetermined threshold range between subsequent iterations of (1)-(4).

24. The apparatus of claim 21, wherein the values of the overallocation limit and the protection levels are determined substantially in real-time as requests for units of the resource are received.

25. The apparatus of claim 21, wherein the overallocation limit is limited by a predetermined overallocation upper bound.

26. The apparatus of claim 21, wherein request for a unit of the resource occurs in two parts comprising:

a first part that does not consume any of the resource and is associated with a first preference value; and a second part associated with a second preference value, the second part being capable of succeeding or failing, wherein the protection levels are determined, at least in part, based on the first preference value and the second preference value and further storing instructions for:
determining whether the second part succeeds or fails;
based on the determination, consuming a unit of the resource if the second part succeeds, or
failing to consume a unit of the resource if the second part fails.

27. The apparatus of claim 26, wherein the second part is associated with a value loss in the event of a failure of the second part.

28. The apparatus of claim 26, wherein the task management controller is configured to attempt to maximize a sum of the first preference value and the second preference value for the requestors.

29. The apparatus of claim 21, wherein a penalty is associated with allocating a unit of the resource but failing to provide the unit of the resource, at least one of the overallocation limit or the protection levels being determined at least in part based on the penalty.

30. The apparatus of claim 21, wherein the overallocation limit is initially determined by:

(a) determining an average wash probability representing a probability among the requestors that the requestors fail to use the allocated unit of the resource, averaged over the requestors, based on historical wash probabilities for the resource among the classes of requestors, (b) determining an average value loss representing an amount of value lost in an event that a given requestor fails to use the allocated unit of the resource, averaged over the requestors, based on historical value loss percentages or a preconfigured default value, (c) using the average wash probability and the average value loss to determine an estimated total value lost among requestors that are predicted to fail to use the allocated unit of the resource, (d) using the average wash probability and a probability distribution representing a quantity of demand for the units of the resource to determine an estimated net capacity utilization, (e) determining an average value representing a value among the requestors that are predicted to show up to utilize the allocated unit of the resource given the net capacity utilization; and (f) adjusting the overallocation limit to maximize an expected value among the different classes of requestors, based at least in part on the average value as determined in (e) and the estimated total value lost as determined in (c).

* * * * *